May 27, 1947.　　　J. DE LA CIERVA　　　2,421,364
SUSTAINING-ROTOR-EQUIPPED AIRCRAFT INCLUDING AUTOROTATABLE ROTOR
CONSTRUCTION AND THE REGULATION OF ROTOR BLADE PITCH
Filed Jan. 15, 1936　　　15 Sheets-Sheet 3
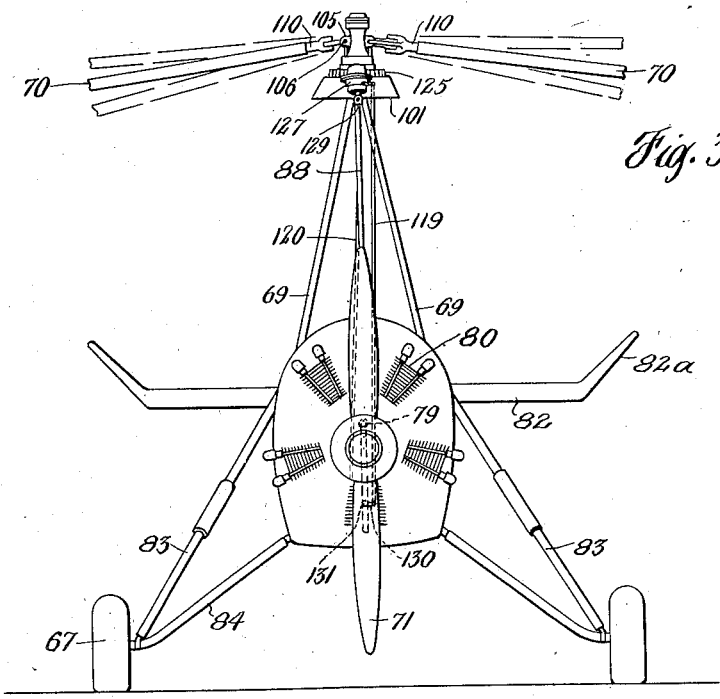
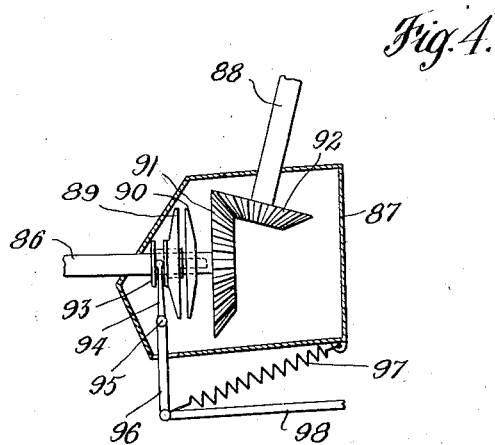
INVENTOR
Juan de la Cierva
BY
Synnestvedt & Lechner
ATTORNEYS May 27, 1947.  J. DE LA CIERVA  2,421,364
SUSTAINING-ROTOR-EQUIPPED AIRCRAFT INCLUDING AUTOROTATABLE ROTOR
CONSTRUCTION AND THE REGULATION OF ROTOR BLADE PITCH
Filed Jan. 15, 1936   15 Sheets-Sheet 4
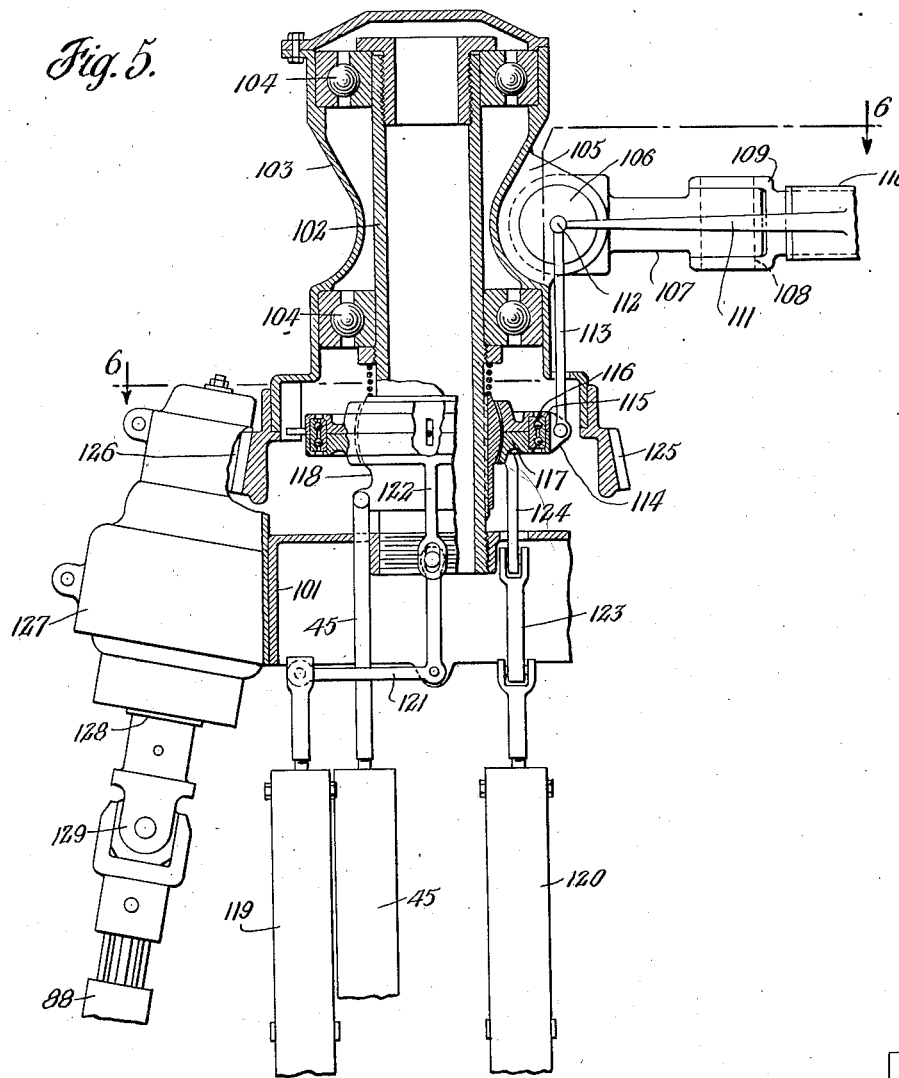
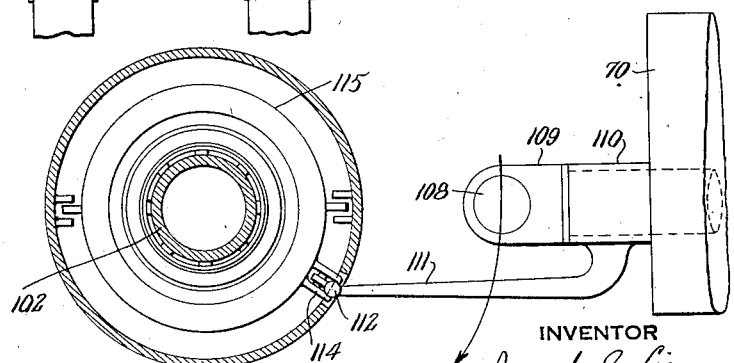
INVENTOR
Juan de la Cierva
BY
Synnestvedt & Lechner
ATTORNEYS

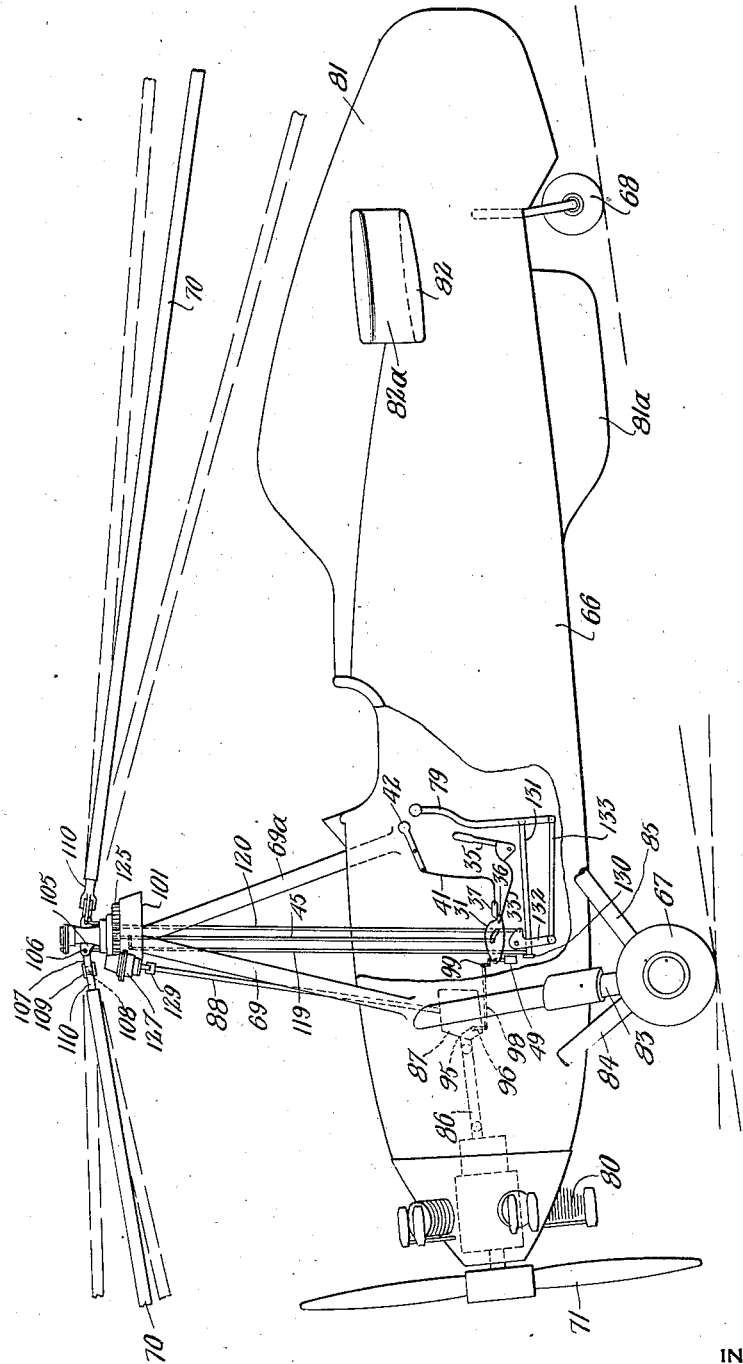

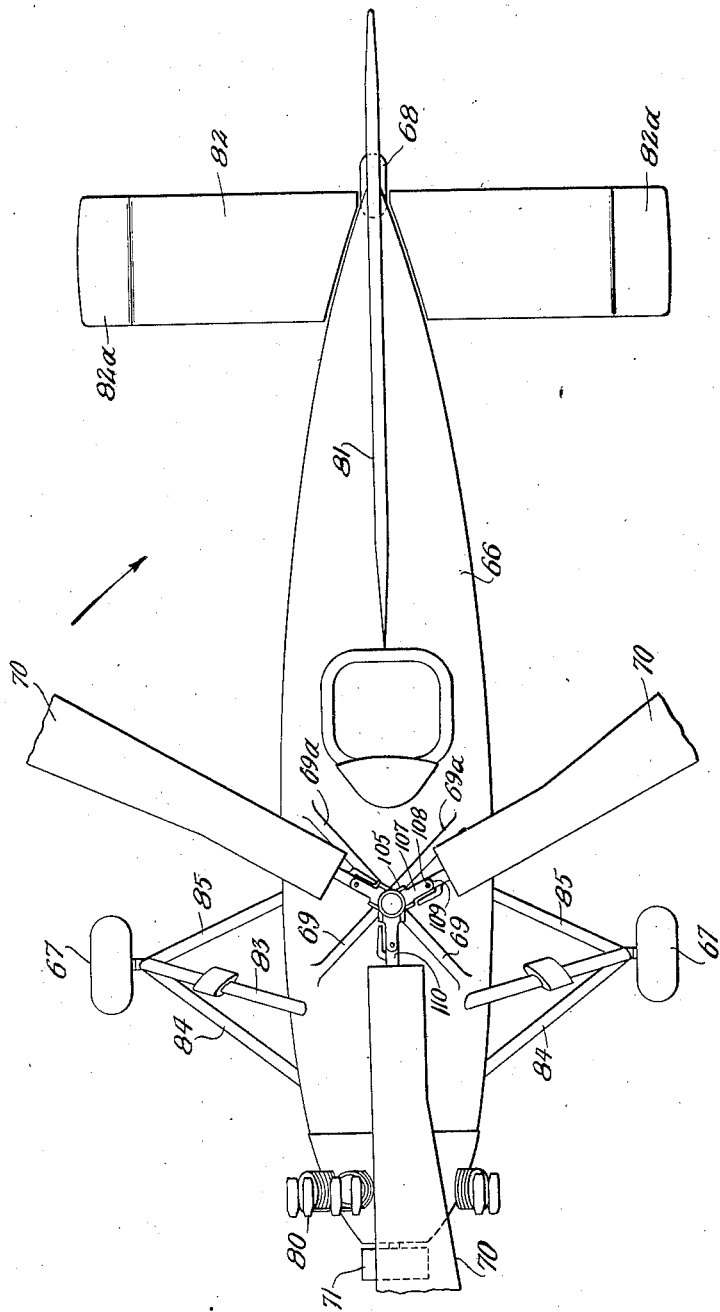

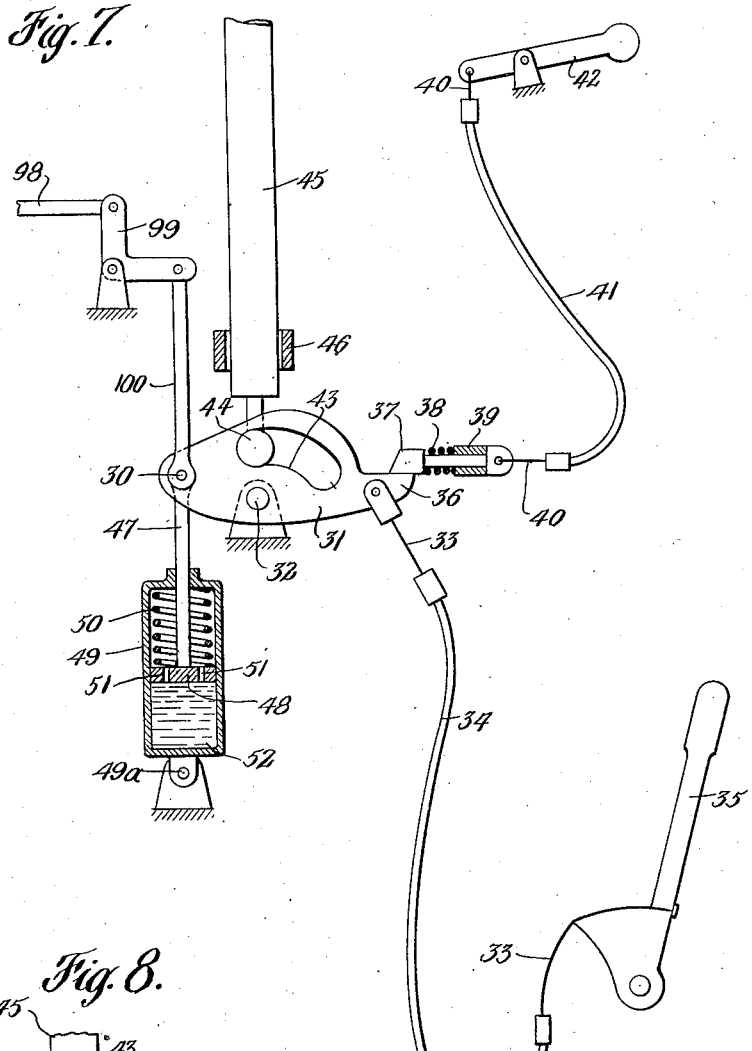
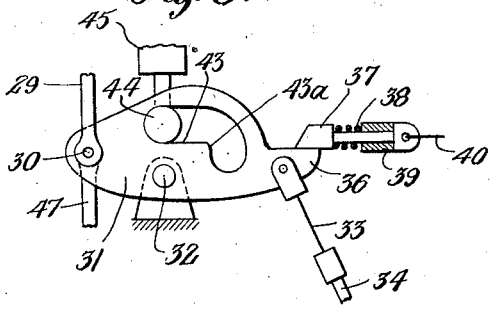
Fig. 7.
Fig. 8.

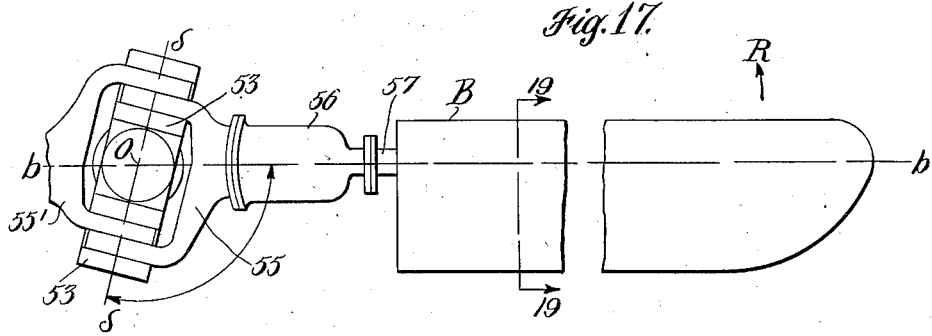
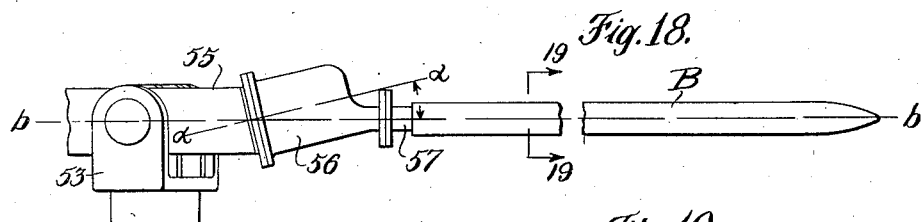
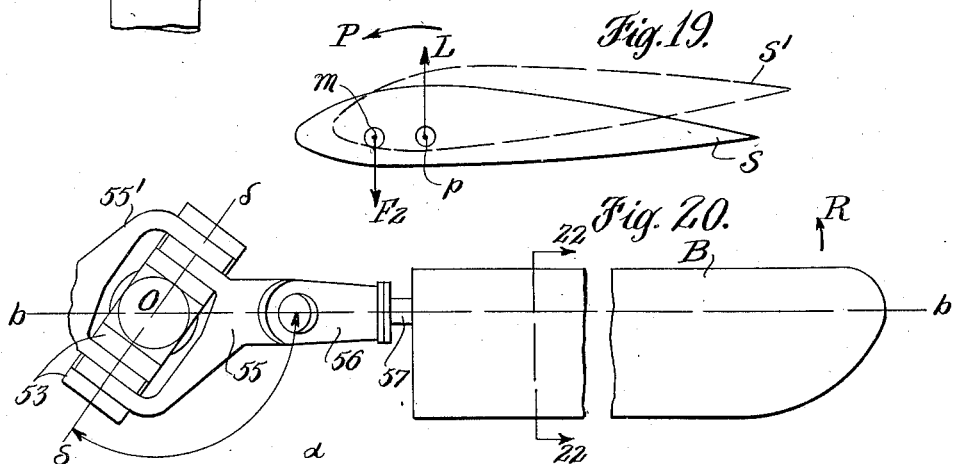
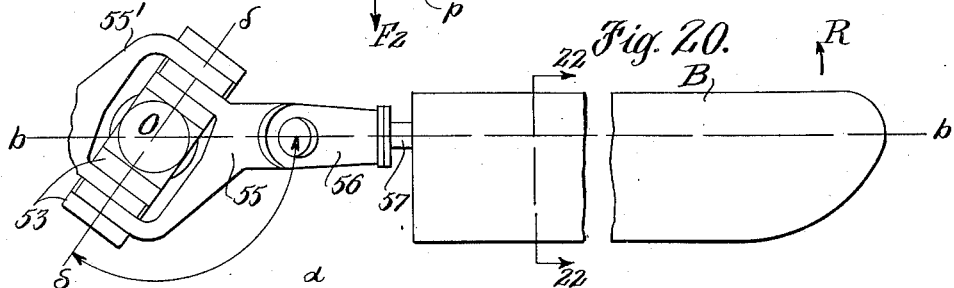
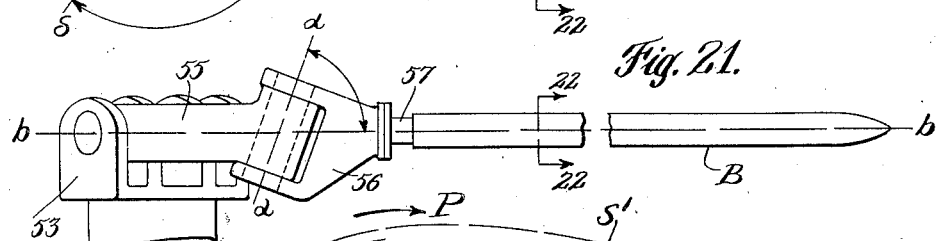
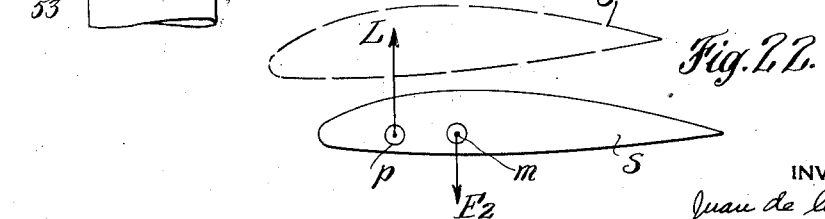

May 27, 1947.    J. DE LA CIERVA    2,421,364
SUSTAINING-ROTOR-EQUIPPED AIRCRAFT INCLUDING AUTOROTATABLE ROTOR
CONSTRUCTION AND THE REGULATION OF ROTOR BLADE PITCH
Filed Jan. 15, 1936    15 Sheets-Sheet 10
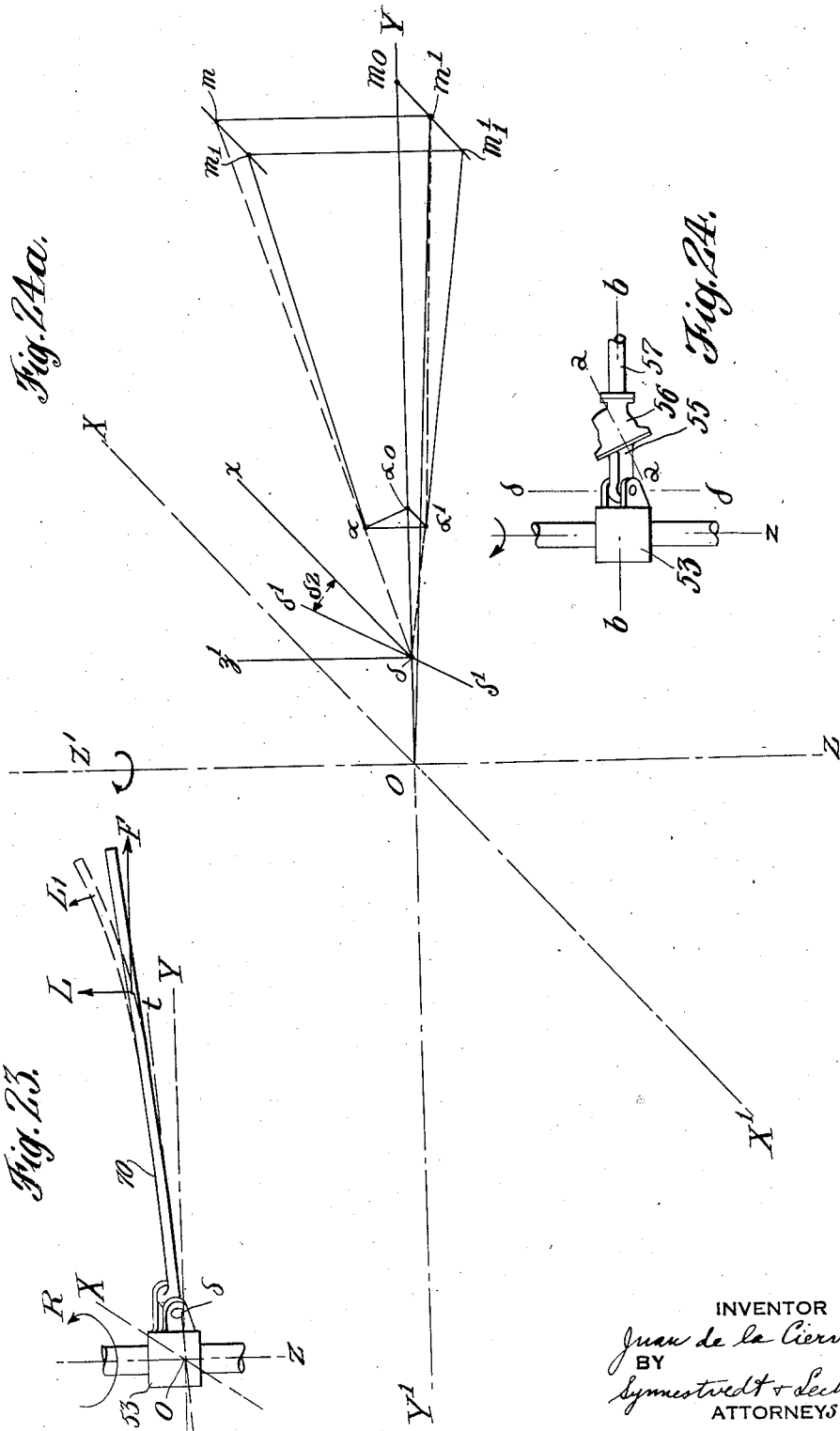
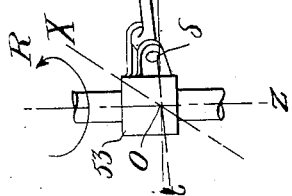
INVENTOR
Juan de la Cierva
BY
Symmestvedt & Lechner
ATTORNEYS Patented May 27, 1947

2,421,364

UNITED STATES PATENT OFFICE 2,421,364

SUSTAINING-ROTOR-EQUIPPED AIRCRAFT, INCLUDING AUTOROTATABLE ROTOR CONSTRUCTION AND THE REGULATION OF ROTOR BLADE PITCH

Juan de la Cierva, Madrid, Spain, assignor, by mesne assignments, to Autogiro Company of America, a corporation of Delaware Application January 15, 1936, Serial No. 59,292
In Great Britain January 16, 1936

60 Claims. (Cl. 244—18)

The present invention relates to sustaining-rotor-equipped aircraft, including autorotatable rotor construction and the regulation of rotor blade pitch, and is particularly useful in that type of craft wherein the principal means of support in flight consists of a system of rotative wings or blades, hereinafter referred to as a rotor, mounted for free rotation about a substantially vertical axis and adapted for autorotation in flight under the influence of the flight wind; and in which means of forward propulsion are provided comprising one or more engines driving an airscrew or airscrews or the like propulsive devices, together with means for imparting an initial rotation to the rotor, usually referred to as a rotor starter, which may comprise a disconnectible driving connection between the said engine and the rotor adapted to apply a torque to said rotor (as in Pecker U. S. Patent 1,999,636).

More particularly, the invention is especially adapted to aircraft having sustaining rotors of the kind referred to, in which the individual blades are attached to the hub or central member of the rotor by flexible or articular connections which permit each blade to swing up and down substantially in a place containing the rotor axis. The purposes and advantages of the invention will be best understood after some consideration of the general state of this art.

In aircraft of the kind above described, the blades are generally attached to the hub each by at least two independent articulations allowing free or damped motion of the blades both in a plane approximately containing the axis of rotation of the rotor and in a plane approximately perpendicular to the rotor axis. These articulations may be referred to, respectively, as "flapping" hinges and "drag" hinges, the first being those around which all or the greater part of the blade oscillation takes place when the blade swings in a plane containing or parallel to the axis of rotation, and the second those around which all or most of the oscillation takes place when the blade swings in a plane perpendicular to the axis of rotation of the rotor or approximately fore-and-aft in the general path of rotation. However, there are alternative ways of adapting the rotor to accommodate or compensate for differential flight forces. For example, the yieldability of the rotor in the flapping sense, sufficient to accommodate differential lift effects (such for instance as are due to translational flight) may be secured by flexible construction or by articular joints, as hereinabove mentioned, or by a combination of both, as hereinafter described with reference to the drawings.

A further development of this type of craft, having an important relationship to the present invention, is disclosed in my prior British Patent specification No. 420,322, and in the corresponding United States application, Serial No. 738,349, filed August 3, 1934, which issued July 31, 1945, as Patent 2,380,583, wherein there is described mechanism to enable aircraft of this kind to take-off without any run on the ground, the operation of which essentially consists in diminishing the pitch angle of the blades during the application of the starting torque by means of the motor starter, to an angle corresponding substantially to the minimum aerodynamical (rotational) drag, and thereafter increasing the pitch angle, simultaneously with the declutching of the rotor starter transmission, to substantially the normal autorotational value suitable for forward flight. A take-off accomplished in this way, with little or no run may be conveniently referred to as a "direct" take-off.

Such aircraft may employ various expedients for controlling and regulating the rotor blade pitch angle, and the devices for this purpose fall naturally into two groups. In the first group, the pitch angle is positively regulated by mechanism controlled more or less independently of the forces acting on the rotor blades themselves, either manually by the pilot (in which case the control may be rendered at least semi-automatic by the interposition of regulating devices, or else by means interconnected with other aircraft controls, e. g., the starter clutch, rotor brake and/or wheel brake controls, or with the undercarriage (the control being at least semi-automatic in this case also); examples of such semi-automatic regulators, interconnections, etc., being disclosed hereinafter and also in my copending application Serial No. 59,293 filed January 15, 1936, which issued as Patent No. 2,155,409 on April 25, 1939.

Pitch controlling and regulating devices falling in this first group might be referred to as "mechanical."

The second group of pitch controlling and regulating devices comprise those in which the pitch angle is controlled in a fully automatic manner in accordance with the balance of forces experienced by the rotor blades themselves, i. e., the applied torque, centrifugal force, aerodynamic lift, drag and pitching moment and inertia forces and by the elastic characteristics of the rotor blades. Devices falling in this category may be referred to as "automatic."

An object of this invention is to provide an improved and more efficient rotor particularly adapted for obtaining the most efficient direct take-off possible, and the invention will be hereinafter described with special reference to its peculiarly advantageous co-operation with the direct take-off type of machine, although a full disclosure of such machine is not included herein as it will be found in the said Patent No. 2,380,583.

In the process of accomplishing a direct take-off, from the instant at which the pitch increase begins until autorotation is established, the rotor operates under a continuously changing regime, characterised by varying inflow, which, starting at zero, has at first a rapidly increasing positive (downward) value, reaching a peak and thereafter declining more slowly to zero again and finally reversing its sign as autorotation establishes itself.

If, for take-off, the blade pitch angle is increased almost instantaneously from about zero to an autorotative value of say 5 or 6 degrees, the thrust of the rotor immediately jumps from nothing to a large (peak) value much exceeding the weight of the aircraft, on account of the initial absence of inflow, and as the (downward) inflow builds up the thrust falls sharply and continues to fall as the rotational speed falls. Thus at the beginning of the take-off there is a violent upward acceleration which is followed by a relatively rapid falling off of lifting effort, which may give rise to a loss of height from the maximum attained, before autorotative flight is established.

An object of the present invention is to obviate the above-mentioned disadvantages.

According to this invention, in an aircraft of the kind referred to, I may provide means operating independently of the pilot's volition for regulating the rate of change of blade pitch angle during the period of changing regime of airflow from the instant of initiating disengagement of the starter clutch until autorotation is established and for limiting the maximum pitch angle attained, in such a way as to minimise fluctuations of the thrust delivered by the rotor and to set maximum limits on the thrust and drag torque of the rotor during the said period of changing regime.

In a preferred method of operation the pitch angle is so regulated that the pitch angle during the initial regime of accelerated (downward) airflow is such as to set a limit on the "peak" thrust delivered which limit is low enough substantially to eliminate all "shock" effect.

Preferably also, the pitch angle is regulated according to such a method that an upper limit is set on the mean drag torque of the rotor, during the whole period of changing regime, said limit being low enough to ensure that the rotational speed exceeds the minimum requisite for autorotation at all times within the said period of changing regime.

With rotors of the characteristics hitherto usual, the mean blade pitch angle, averaged over the whole period of changing regime, should not exceed 8° measured from no lift.

Means are preferably provided, which are brought into action on the initiation of withdrawal of the starter clutch and thereupon control and regulate the rotor blade pitch angle independently of the volition of the pilot in such a way that the pitch angle is increased from about zero to a certain maximum value and eventually to a desired value within the autorotative range of pitch angle (which value may be less than said maximum value, said means utilising either a "timing" device operative to impose a predetermined rate of change on variation of pitch angle or an "automatic" pitch changing device or a combination of "timing" and "automatic" devices to obtain such a graduated variation of pitch angle as will minimise fluctuations of rotor thrust during the "take-off."

Where the pitch control is of the mechanical type, the pitch changing mechanism may include a "timing" device, e. g., a damped spring, operative to effect an increase of blade pitch angle in a predetermined manner independently of the pilot's volition on disengagement of the starter clutch.

Where, however, the pitch is controlled by automatic means, operative to increase the pitch angle on the disengagement of the starter clutch, which clutch is normally biased to disengaged position, the disengagement of the clutch may be regulated by a "timing" device, e. g., a damped spring acting independently of the pilot's volition.

Alternatively, the action of the automatic pitch changing means itself may be regulated by a "timing" device, at least as long as the pitch angle is less than in normal autorotation.

I have found that the optimum delay in the initial increase of pitch angle is such that a value at least great enough for normal autorotation is attained in about 0.3 second.

According to a feature of the invention, the rotor may have "automatic" pitch changing means so operative that a decrease of pitch angle is associated with an increase of the ratio thrust/centrifugal force and vice versa.

The effect of this is to prolong the direct lift effect by slowing down the rate of decrease of thrust after the peak value has been passed as hereinafter more fully explained.

How the foregoing, together with such other objects and advantages as are incident to the invention, are obtained will be further evident after perusal of the following description of the structural embodiments of the invention illustrated in the accompanying drawings, wherein:

Fig. 1 is a general view in side elevation of an aircraft incorporating one embodiment of the present invention.

Fig. 2 is another general view of the same in plan.

Fig. 3 is a further general view of the same in front elevation.

Fig. 4 is a diagrammatic representation in side elevation of the starter clutch elements of the aircraft.

Fig. 5 is a view to an enlarged scale in central longitudinal vertical section of the rotor head and blade root articulation of the aircraft of Figs. 1 to 3.

Fig. 6 is a detail view in section taken along the line 6—6 of Fig. 5.

Fig. 7 is a diagrammatic detailed view to an enlarged scale generally in side elevation of the control mechanism of the starter clutch and rotor blade pitch changing gear.

Fig. 8 is a detail view of a modification corresponding to a part of Fig. 7.

Fig. 9 is a view similar to Fig. 7 illustrating a modification.

Fig. 10 shows a detail view of Fig. 9 in section taken along the line 10—10 of Fig. 9.

Fig. 11 is a detail view in side elevation illustrating a further modification of the mechanism of Figs. 7 or 9.

Fig. 12 is a view similar to Fig. 11 illustrating a modification of the mechanism of Fig. 11.

Fig. 17 is a somewhat diagrammatic view in plan of a rotor hub and blade root articulation according to a modification of the showing of Figs. 13 to 15.

Fig. 18 is a view of the same in side elevation.

Fig. 19 is a view in section taken along the line 19—19 of Figs. 17 and 18.

Figs. 20, 21 and 22 are views similar to Figs. 17, 18 and 19 respectively showing a modified disposition of the blade articulation axes; Fig. 20 being in plan; Fig. 21 in side elevation; and Fig. 22 in section taken along the line 22—22 of Figs. 20, 21.

Fig. 23 is a somewhat diagrammatic view in isometric projection representing a rotor blade and a "flapping" pivot of a rotor blade assembly of the kind shown in Figs. 17 to 22 to illustrate the effect of flexibility of the rotor blade in the radial-axial plane.

Figure 13:
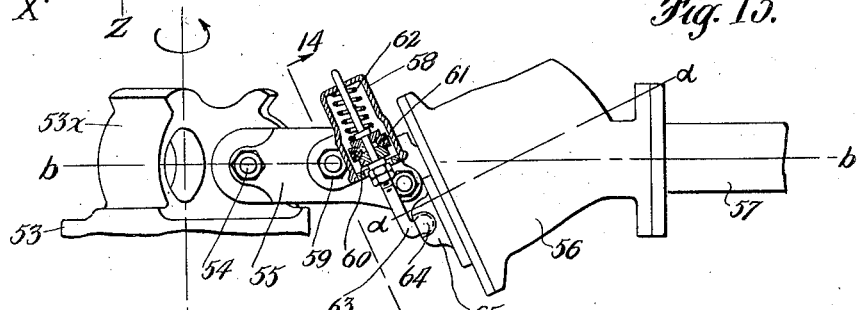
Fig. 13 is a view in side elevation, partly in section, of the top of the rotor hub and the blade root articulation according to a second embodiment of said features of the invention.

Fig. 24 is a somewhat diagrammatic view in side elevation, similar to Fig. 13, of the top of a rotor hub and blade root articulation according to another embodiment of said features of the invention.

Figure 15:
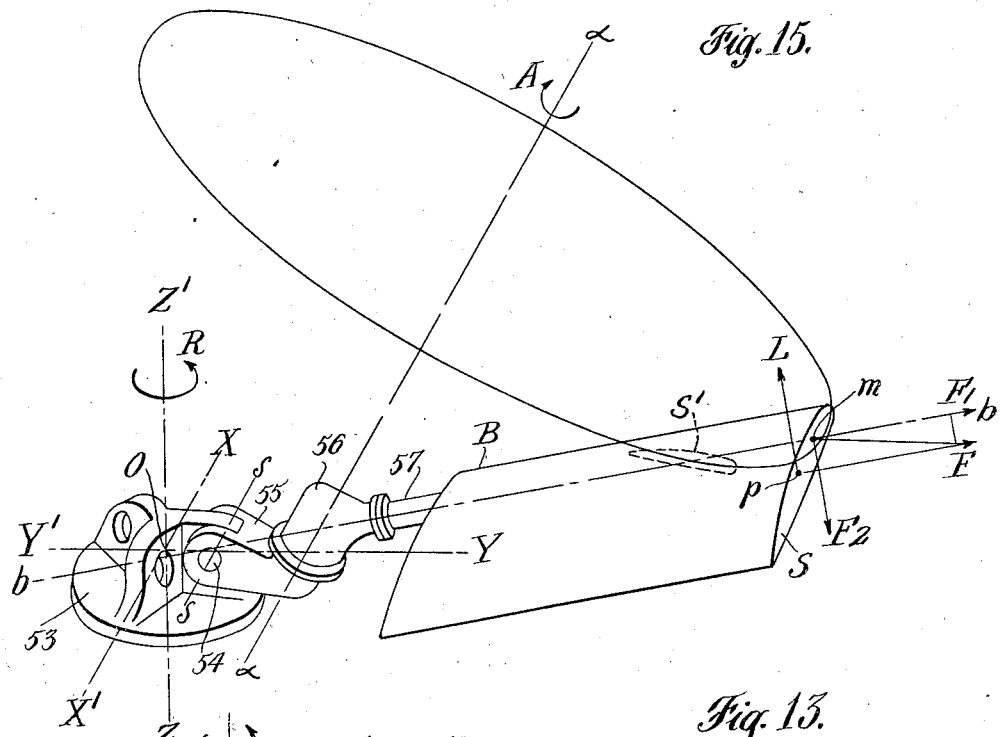
Fig. 15 is a somewhat diagrammatic representation in isometric projection of a rotor hub and blade of the kind shown in Figs. 13 and 14, illustrative of the operation thereof.
Figure 16A:
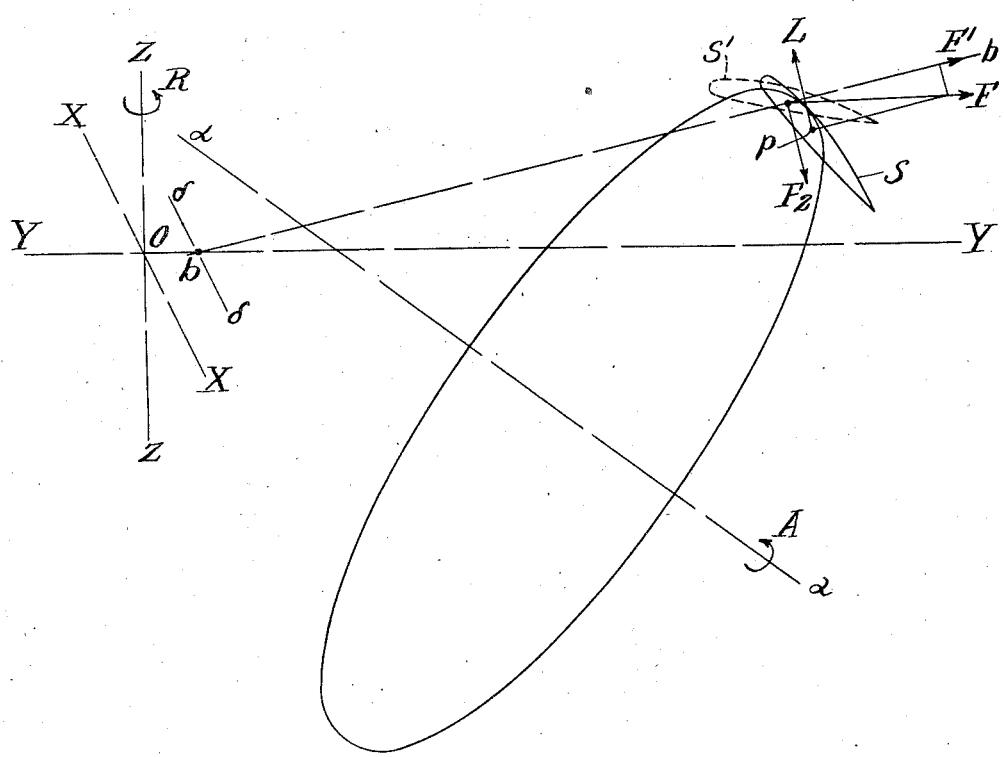
Fig. 16a is a diagrammatic skeleton view in isometric projection, generally similar to Fig. 15, showing the position of the axes of the various parts of the rotor hub and blade articulation of the structure shown in Fig. 16, illustrative of the operation thereof.

Fig. 24a is a diagrammatic skeleton view in isometric projection, generally similar to Fig. 15 or Fig. 16a, showing the position of the axes of the various parts of the rotor hub and blade articulation of the structure shown in Fig. 24, being illustrative of the operation thereof.

Figure 25:
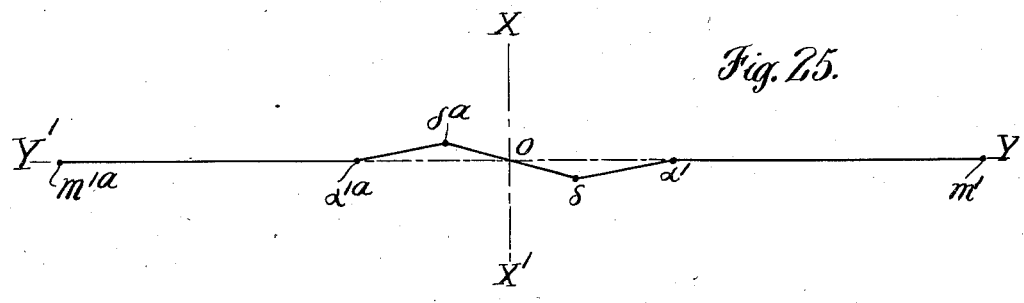
Figure 26:
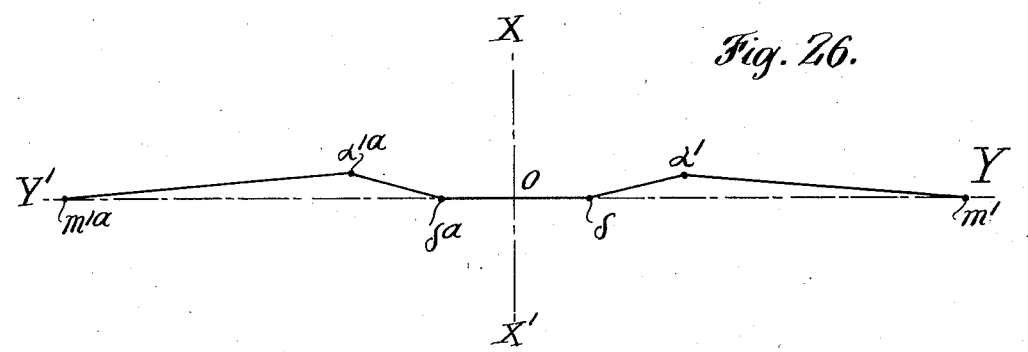
Figure 27:
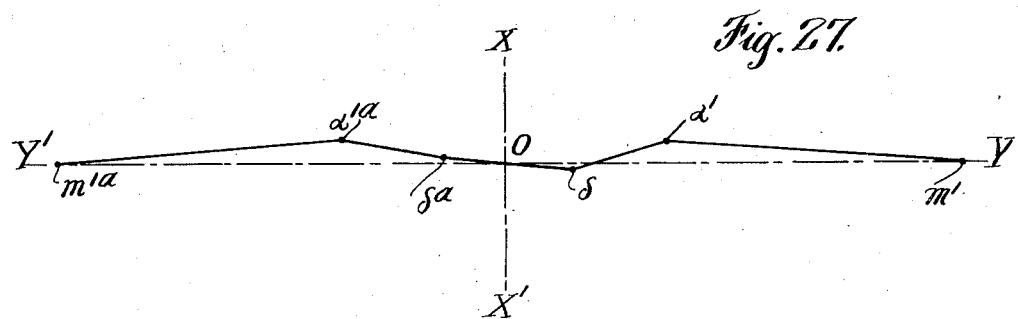
Figure 28:
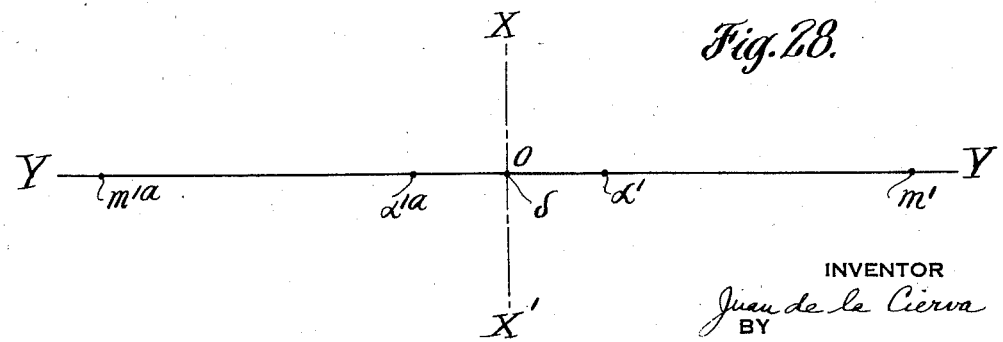

Figs. 25 to 28 are further diagrammatic views of the embodiment of Fig. 24, these views being in plan; Figs. 25, 26 and 27 respectively illustrating different modes of blade displacement; and Fig. 28 illustrating the same mode of blade displacement as Fig. 26 in the assumed case in which the flapping pivots intersect the rotational axis instead of being offset therefrom.

Figure 29:
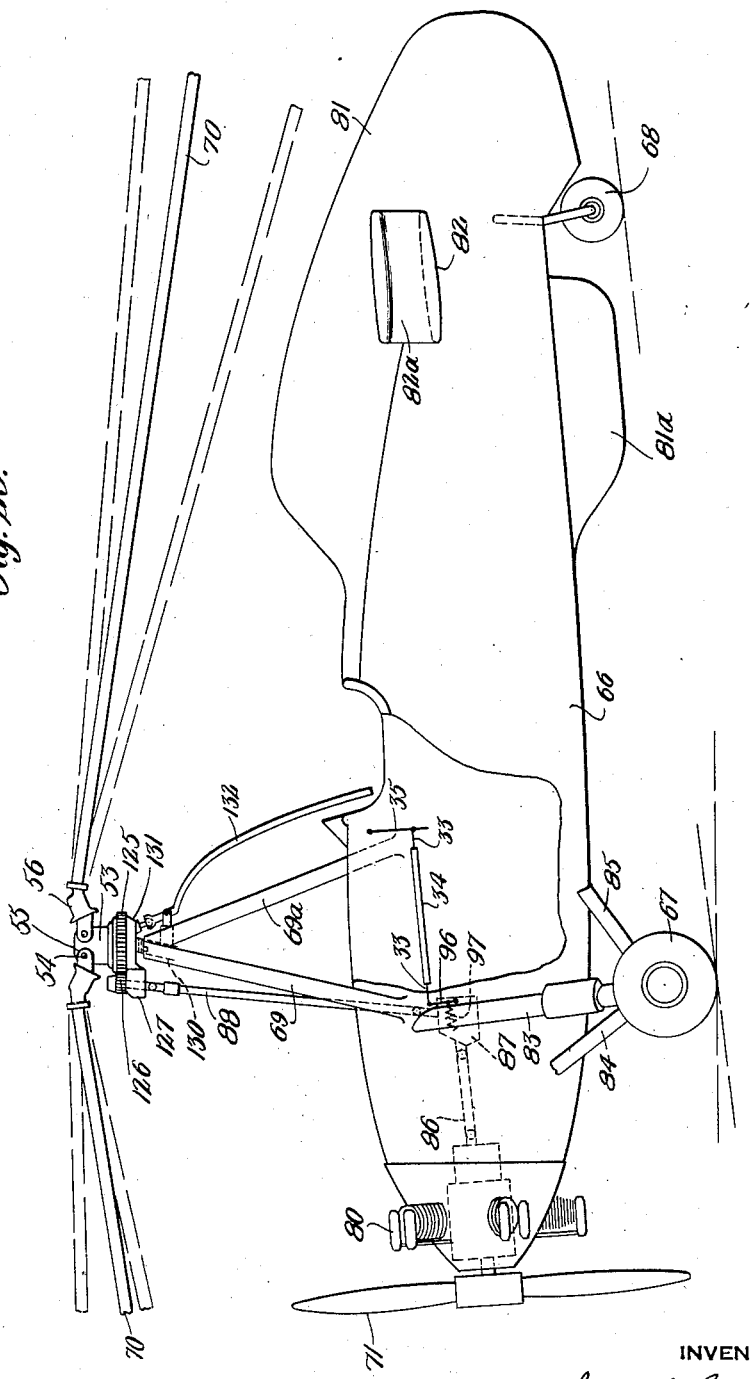
Figure 30:
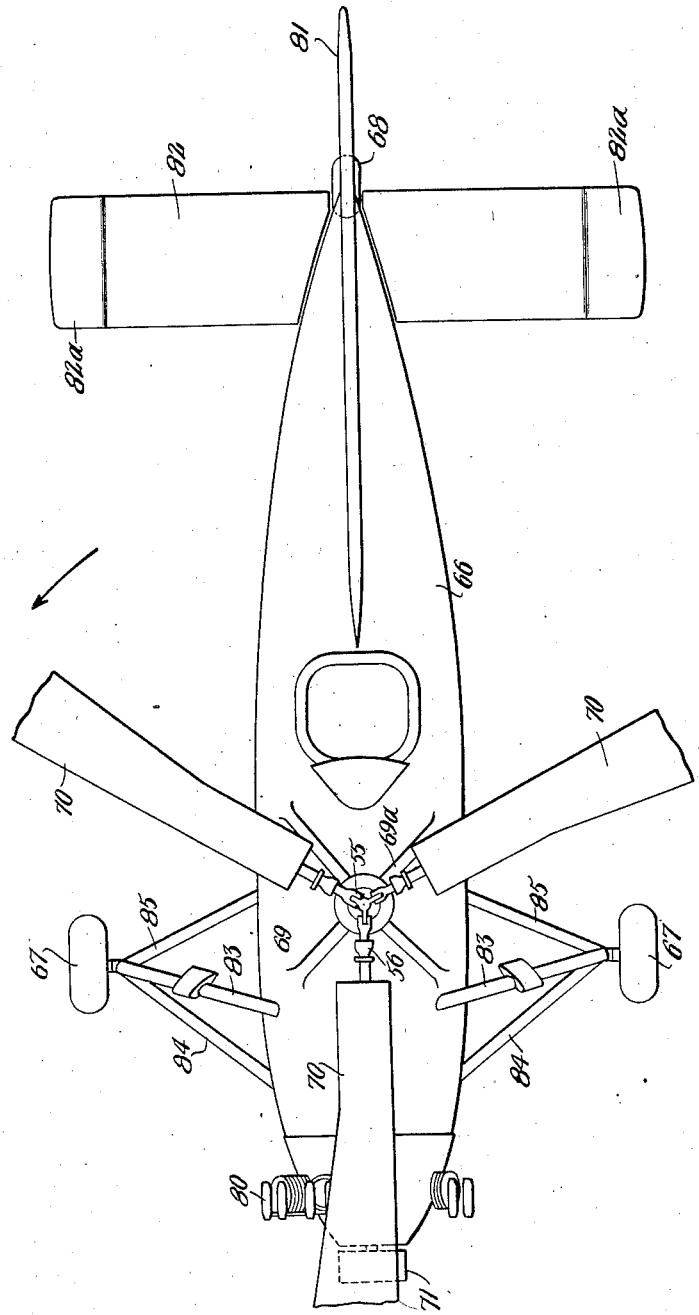
Figure 31:
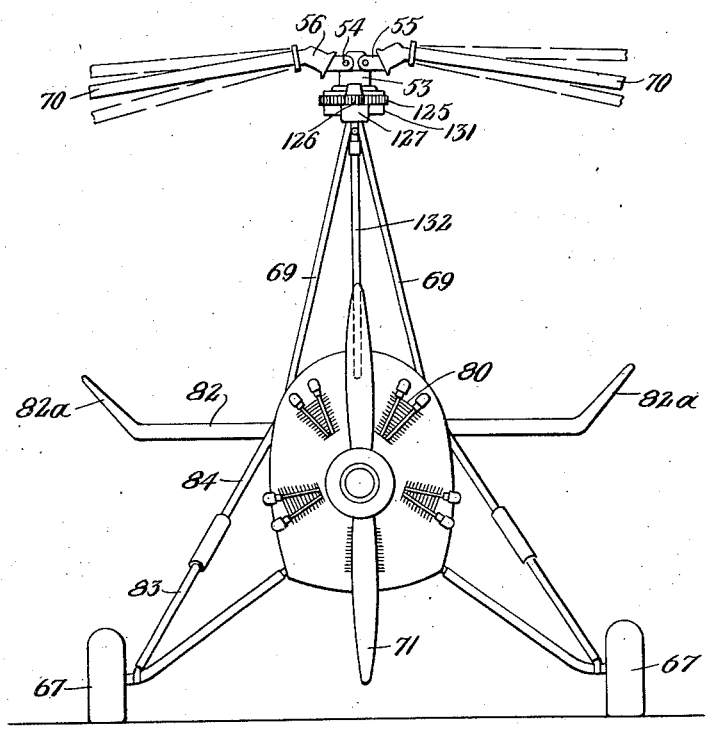

Figs. 29 to 31 are general views of an aircraft incorporating the second general embodiment of the invention according to any of Figs. 13 to 28, Fig. 29 being in side elevation, Fig. 30 in plan and Fig. 31 in front elevation.

Figure 32:
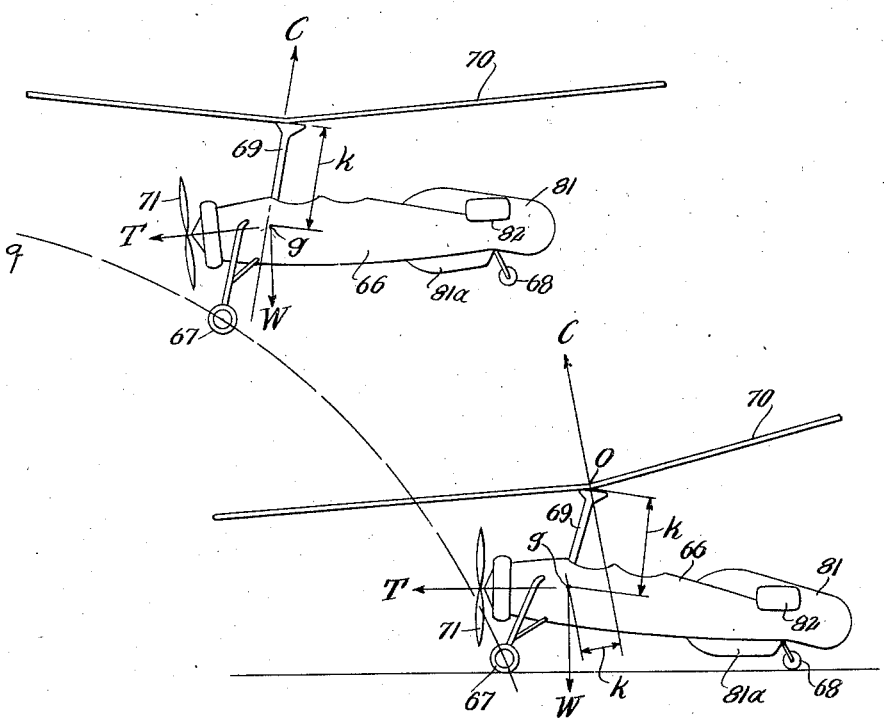

Fig. 32 shows diagrammatically in side elevation an aircraft according to the present invention in the act of taking-off, the aircraft being shown in two positions, viz., in the lower part of the figure before leaving the ground and in the upper part of the figure just before attaining autorotative flight.

Referring to Figs. 1 to 3; the aircraft shown comprises a body 66, engine 80 and airscrew 71. On the rear end of the body are mounted vertical stabilising fins 81, 81a and a horizontal stabiliser 82 having upturned tips 82a. At rest the aircraft is supported on main wheels 67 and a tail wheel 68, the former being mounted on the usual undercarriage structure consisting of telescopic struts 83 and radius rods 84, 85. The rotor, consisting of three elongated blades 70 and a rotor head assembly described below with reference to Fig. 5, is carried on a rotor supporting pylon structure consisting of struts 69, 69a. Various typical aeroform profiles for the blades, capable of autorotation, are shown in Figures 6, 15, 16a, 19, and 22.

For imparting initial rotation to the rotor before flight there is provided a transmission from the engine to the rotor comprising a horizontal shaft 86 coupled to the engine and an upright shaft 88 connected through gearing to the rotor hub, the rearward and lower ends respectively of shafts 86, 88 being received within a housing 87, where they are coupled through a clutch and gearing, the elements of which are diagrammatically shown in Fig. 4. The starter clutch is controlled by a lever 96 keyed on a shaft 95 and biased to clutch disengaging position by a spring 97 and a lever 96 is connected by a rod 98 through the mechanism shown in Fig. 7 to a tension transmitting element 33 enclosed within a sheath 34 and connected to a hand lever 35.

Control of the aircraft in flight is by means of a universally rockable control column 79 which is connected to the rotor head by means of rods 119, 120, longitudinal control being effected by an endwise movement of the rod 120, which is connected to the column 79 by means of a bell crank 132 and link 133 and the lateral control being effected by an endwise movement of the rod 119, which is connected to the column 79 by means of a crank 130 (see Fig. 3) mounted on a longitudinal rocking shaft 131 on which the column 79 is pivoted for longitudinal movements and which is rotated by lateral movements of the control column.

Referring now to Fig. 4; a shaft 86 drives the shaft 88 through a clutch 89, 90 and a bevel gear pair 91, 92. The clutch member 90 is fast on the shaft of the bevel gear 91 and the clutch member 89 is slidable on the shaft 86, the end of which is spigotted into the shaft of the gear 91 and is movable by means of a striking lever 94 engaging in the groove of a thrust collar 93 secured to the member 89. The external lever 96 already described is secured on the shaft 95 of the lever 94.

Referring to Figs. 5 and 6; the rotor head assembly comprises an apex member 101 which is secured to the pylon struts 69, 69a. The member 101 terminates upwardly in a tubular axle member 102 on which is rotatable by means of bearings 104 a rotor hub 103. The latter member comprises lateral pivot lugs 105 supporting the flapping pivot pins 106 on which are rotatably mounted drag links 107 supporting drag pivot pins 108. On the latter are rotatably mounted forked blade root members 109 supporting the roots 110 of the blades 70.

To the lower end of the hub member 103 is secured a gear ring 125 meshing with a pinion 126 enclosed within a housing 127. Pinion 126 is mounted on a short shaft 128 journaled within the housing 127 and connected at its lower end by means of a joint 129 with the upright shaft 88 of the starter drive transmission.

In order to enable the pitch angles of the rotor blades to be varied the blade root element 110 is rotatable on the root member 109 and carries a lever 111, the disposition of which is shown more clearly in Fig. 6, in which the direction of rotation of the rotor is indicated by an arrow, and this lever 111 is universally articulated at 112 to a rod 113, the raising or lowering of which alters the pitch angles of the rotor blade. In order that the flapping of the blade about the pivot 106 shall not introduce appreciable variations of pitch angle the articulation pivot 112 is situated on the axis of the pivot pin 106 when the blade is set at its normal flying pitch angle.

Movement of the rods 113 to control the blade pitch angle is effected by pivoting their lower ends to lugs 114 mounted on a ring 115 which rotates with the rotor, being supported by means of bearings 116 on a non-rotative collar 117 carried by a sleeve 118 which is slidable but non-rotatable on the axle member 102.

Variation of the pitch angles of all the blades together is effected by raising and lowering the sleeve 118, which is connected for this purpose to a rod 45, the lower end of which is actuated by the mechanism shown in Fig. 7. The lever 111 is placed forwardly of the blade axis with respect to the direction of rotation (see Fig. 6) so that an increase of blade pitch angle is produced by raising the rod 45 and the elements 113 to 118 and vice versa.

Longitudinal and lateral control of the aircraft in flight is obtained by differential variation of the blade pitch angles and this is effected by tilting the collar 117 laterally and longitudinally, for which purpose it is universally rockably mounted on the sleeve 118 by means of a spherical joint and its tilt is controlled by means of the rods 119, 120 operating through linkages 121, 122 and 123, 124 respectively. As the mechanism for obtaining longitudinal and lateral flying control by differential pitch variation is not per se part of the present invention it will not be further described. This mechanism is fully described in my copending application for patent, Serial No. 698,372, filed November 16, 1933, corresponding to British Patent No. 410,532, which copending application issued on July 31, 1945, as Patent 2,380,582.

Referring to Fig. 7: the lower end of the pitch controlling rod 45 is guided in a support 46, and terminates in a stud 44 engaging a curved slot 43 formed in a cam plate 31 pivoted on a fixed point at 32 and including a projection 36 engageable by a catch 37. The latter is biased to a position of engagement with projection 36 by a spring 38 acting on an abutment 39 in which the catch 37 is slidable and the said catch is withdrawable from the engaging position by means of a tension element 40 enclosed in a flexible sheath 41 and connected to a hand lever 42. Cam plate 31 is also connected by means of a tension element 33 enclosed within a flexible sheath 34 to the hand lever 35.

The cam plate is further connected by means of a rod 100 pivoted to the cam plate at 30 and a bell crank 99 with the starter clutch actuating rod 98 (see Fig. 1). Cam plate 31 is also connected to a spring loaded dashpot device comprising an oil-filled cylinder 49 anchored at a fixed point 49a, within which is a slidable piston 48 provided with oil throttling orifices 51 and biased by a spring 50, the piston being connected with the cam plate 31 by means of a rod 47 slidably guided in the end of cylinder 49 and pivoted to the cam plate 31 at 30.

The cam slot 43 is so shaped that when the cam plate 31 is rocked in a couner-clockwise direction from the position shown in Fig. 7 the pitch controlling rod 45 is raised, thereby increasing the blade pitch angle.

The operation of this mechanism is as follows:

To engage the clutch the lever 35 is rocked in a clockwise direction. The motion of lever 35 is communicated by the tension connection 33 to the cam plate 31, which is thereby rocked in a clockwise direction. The connection 47 raises the piston 48 and puts the spring 50 under compression and the connection 99, 100 moves the rod 98 to the left and rocks the clutch operating lever 96 in the direction for engaging the clutch (Fig. 4). At the same time the stud 44 is brought to the left-hand end of the cam slot 43, thus lowering the rod 45 and decreasing the rotor blade pitch angle to its minimum limit, which should be substantially zero. The clockwise movement of the cam plate 31 causes the projection 36 thereof to spring over the catch 37 and engage therewith, so that the cam plate and with it the pitch varying and clutch controlling mechanisms are locked in the position shown in Fig. 7 with the pitch angle at minimum value and the clutch engaged.

On depressing the release lever 42 the catch 37 is withdrawn from the projection 36, whereupon the cam plate 31 is rotated in a counter-clockwise direction by the action of the spring 50 assisted by the clutch lever return spring 97 (see Fig. 4), thus disengaging the clutch and increasing the pitch angle from its minimum to its maximum value as the stud 44 travels along the slot 43. The rate at which this takes place is independent of the volition of the pilot and is determined solely by the characteristics of the dashpot 48 to 52, which introduces a certain delay in the disengagement of the clutch and the increase of pitch angle. The damping action of the dashpot ensures that the counter-clockwise rotation of the cam plate 31 takes place at a substantially constant speed and further the rate of change of blade pitch angle is regulated at every instant of this process by the slope of the cam slot 43 from point to point of its length.

It will be seen that the cam slot of Fig. 7 is designed to produce a somewhat more rapid increase of pitch at the beginning of the process than towards the end as it is desirable to have a fairly rapid increase of pitch angle at first in order to generate an adequate upward thrust on the rotor for lifting the machine from the ground before the rotational speed has sensibly decreased and thereafter to increase the pitch angle somewhat more slowly in order to maintain the thrust as the rotational speed of the rotor decreases and the downward inflow through the rotor disc accelerates. At the same time the initial rate of pitch increase must not be so great that an excessive "peak" thrust is developed by reason of the absence of inflow through the disc at the beginning of the process.

In order however to obtain the maximum benefit of the temporary direct lift effect, it is desirable to increase the pitch angle towards the end of the process to a value somewhat greater than that required for normal autorotative flight, so as to maintain the thrust as the rotational speed of the rotor falls and for this purpose a modified cam slot of the kind shown in Fig. 8 may be used. In this case the cam slot 43 has a distinct "hump" at 43a and when the stud 44 passes over the "hump" 43a the blade pitch angle attains its maximum value, being thereafter decreased to its normal autorotative flying value when the stud 44 reaches the right-hand end of the slot 43.

In the foregoing construction the delaying action of the dashpot device is applied to the disengagement of the clutch as well as to the increasing of the blade pitch angle. This feature is on the whole desirable but is not universally necessary and in certain aircraft it may be advisable for the disengagement to be undamped, in which case the modified construction shown in Figs. 9 and 10 may be adopted. This differs from that shown in Fig. 7 in that the clutch operating mechanism 98, 100 is not connected direct to the cam plate 31 but to an auxiliary lever 31x mounted on the same pivot 32 as the cam plate 31. In this case also the tension element 33 of the clutch engaging lever 35 is attached to the lever 31x and the projection 36 engaged by the catch 37 is formed on the lever 31x.

In order that the clockwise movement of the hand lever 35 to engage the clutch shall also set the blade pitch angle to a minimum, the lever 31x engages a projection 31a formed on the cam plate 31, whereby clockwise rotation of the lever 31x is communicated to the cam plate 31. When the catch 37 is released disengagement of the clutch under the action of the return spring 97 of Fig. 4 takes place without damping restraint and the release of the projection 31a allows the dashpot device 47 to 52 to rotate the cam plate 31 in the counter-clockwise direction to increase the pitch at a predetermined rate independent of the pilot's volition, as already described in connection with Fig. 7. Thus, the effect is equivalent to a sequential operation, in that the clutch is fully released before completion of the pitch-increasing action of the cam plate.

Figures 9, 10, 11, 12:
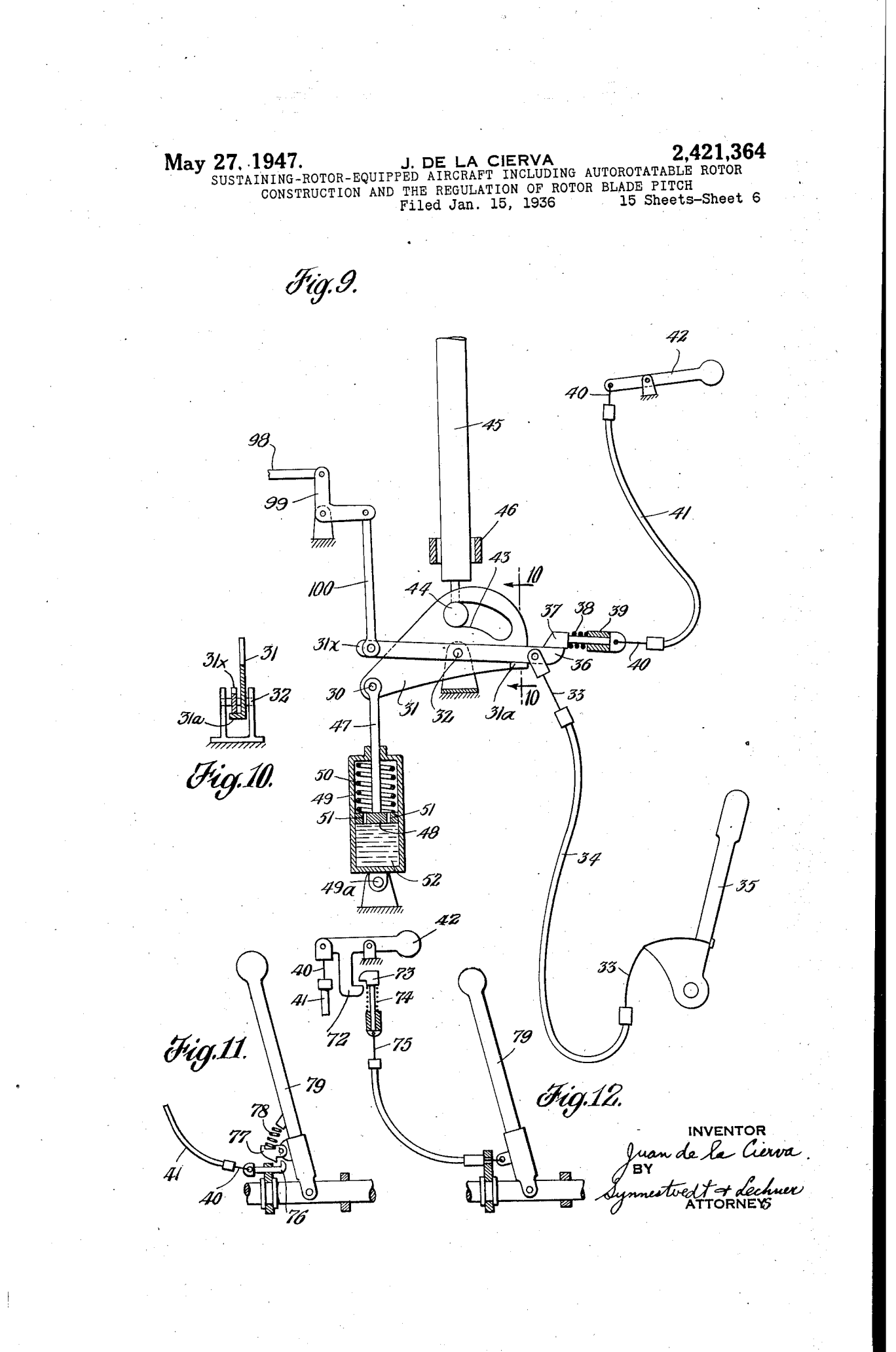

Figs. 11 and 12 illustrate a modification in which the release device 37 to 41 is interconnected with the pilot's control column 79 in such a way that a backward movement of the control column from the fully forward position (in which the angle of incidence of the rotor as a whole is a minimum) automatically releases the catch 37 to allow the clutch to disengage and the pitch angle to increase, or alternatively in such a way that the control column is locked in the fully forward position until the hand release lever 42 is pressed down to release the catch 37.

In Fig. 11 the tension element 40 connected to the catch 37 is connected at its other end to a hook 76 engageable by a catch 77 pivoted on the control column 79 and biased to engaging position by a spring 78. When the control column is moved into its most forward position the catch 77 springs over the hook 76 and engages therewith, so that on moving the control column back from this position the tension element 40 is pulled to release the catch 37.

On the other hand in Fig. 12 the tension element 40 is connected as before to the hand release lever 42 on which is formed a hook 72 engaging a catch 73 connected by means of a flexibly sheathed tension element 75 with the control column 79 and biased to engaging position by means of a spring 74. In this arrangement on the movement of the control column into the fully forward position the catch 73 springs over and engages with the hook 72, thus locking the control column in the forward position until the hook 72 is released from catch 73 by depressing the knob of the release lever 42.

A second general embodiment of the invention is illustrated in Figs. 13 to 31. The aircraft, of which general views from three aspects are shown in Figs. 29 to 31, is in most respects similar to the aircraft in Figs. 1 to 3, the chief difference in the aircraft considered as a whole being in the arrangement of the rotor head and controls. In this instance, control in flight is effected by inclining the rotor bodily as a whole. The rotor mounting pylon 69, 69a terminates in an apex member 130 to which is universally pivoted an axis member 131 on which is rotatably supported the hub member 53. The universal pivots connecting the axis member 131 and the apex member 130 may be enclosed within the former of these members, or may be located therebelow as shown in dotted lines in Fig. 29 of the drawings. The bearings on which the hub 53 is freely rotatably mounted are enclosed within the hub and do not appear on the drawings. Mechanism of this kind is fully described in my co-pending application for patent, Serial No. 645,985, filed December 6, 1932, corresponding to British Patent No. 393,976, which copending application issued on July 31, 1945, as Patent 2,380,580. The axis member 131 is connected for control purposes to a hanging pilot's control lever 132 and as the means for controlling the aircraft in flight are not per se part of the present invention they are not further illustrated or described herein but a description of the mounting of the control lever will be found in my copending application, Serial No. 59,293, filed January 15, 1936, which copending application issued on April 25, 1939, as Patent 2,155,409. As in the previous instance, the rotor hub has fixed to its lower extremity a ring gear 125 meshed with a pinion 126 contained within a housing 127, the latter being supported on the axis member 131 and as before the pinion 126 is connected to the upper extremity of the upright shaft 88 of the rotor starting transmission.

Figure 14:
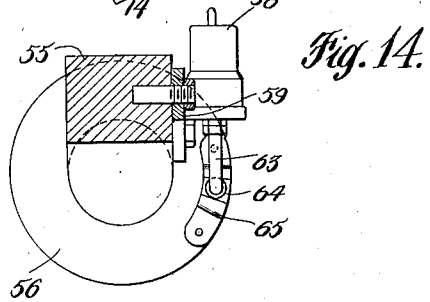
Fig. 14 is a sectional view taken along the line 14—14 of Fig. 13.

The connections of the rotor blades 70 to the rotor hub are shown more clearly in Figs. 13, 14. The rotor hub 53 terminates upwardly in lugs 53x in which are mounted flapping pivot pins 54. On these are articulated drag links 55 each terminating in a drag pivot pin or trunnion on which is rotatably mounted by means of bearings (not shown) a drag pivot housing 56 terminating in a flange for attachment to the flanged inner end of blade root fitting 57 to which is secured a rotor blade 70, the latter being omitted from Fig. 13 but shown in Figs. 29 to 31. The axis of the drag pivot pin (termed alpha axis) is shown in Fig. 13 at $\alpha$—$\alpha$ and it will be seen that this axis is inclined upwardly and outwardly at an acute angle to the longitudinal blade axis $b$—$b$.

The result of this arrangement is that movement of the blade on the drag pivot is associated with a change in blade pitch angle such that when the blade lags behind its normal mean radial position, the pitch angle is decreased and vice versa. By this means an automatic control of pitch angle during the starting of the rotor and the take-off is obtained, the effect of the application of the starting torque to the rotor causing the blade to lag and therefore decrease its pitch angle, whereas when the starting torque vanishes on the disengagement of the starter clutch, the blade swings about its drag pivot approximately into its normal mean radial position with a consequent increase of pitch angle to about the value obtaining in autorotative flight.

According to the invention the rate at which the pitch angle is varied on disengagement of the starter clutch is automatically regulated by a friction damping device operative between the drag pivot housing 56 and the drag link 55. This mechanism, which is shown in Figs. 13 and 14, comprises a cylinder 58 mounted on a bracket 59 secured to the drag link 55, and a piston 60 slidable within the cylinder and carrying a friction ring 61 for engagement with the inner wall of the cylinder. The piston 60 is urged towards the bottom of the cylinder by a spring 62 and is provided with an extension rod 63 projecting outside the cylinder and terminating in a ball 64 engaging in a socket 65 mounted on the drag pivot 56. These parts are so disposed with respect to one another that when the blade is in its normal mean radial position, the piston 60 is at the bottom of the cylinder 68 as shown in Fig. 13 and the assembly is biased towards this position by a spring 62. It will be seen from Fig. 13 that the lower part of the bore of the cylinder 58 is enlarged, and when the piston is located in this part of the cylinder there is a clearance between the piston ring 61 and the cylinder wall, so that for small oscillations of the blade about its mean radial position, there is no frictional resistance to movement by the damping device 58, 60, etc. On the other hand, when the blade lags considerably behind its mean radial position, the piston 60 is moved up into the constricted part of the bore of the cylinder 58 where there is no clearance between the cylinder wall and the friction ring 61. In this way the movement of the blade is subjected to a powerful frictional resistance for displacement about the drag pivot within the range corresponding to engagement of the friction ring 61 with the wall of the cylinder 58 so that as the blade moves from its fully lagging position to its normal mean radial position on the disengagement of the starter clutch, the speed of this movement and therefore the rate of change of pitch angle, is automatically regulated by the centrifugal restoring couple, which decreases as the blade approaches its mean radial position, the pressure of spring 62 which is substantially constant and the frictional resistance of the damping means 58, 61 which is also substantially constant.

This ensures that the rate of change of pitch angle decreases progressively as the pitch is increased, but even at the beginning of the movement is not great enough to give rise to an excessive "peak" thrust on the rotor, the effect being substantially similar to that obtained with the dashpot regulated cam mechanism incorporated in the first embodiment of the invention hereinbefore described.

The mechanism of Figs. 13, 14 will not of itself reproduce the effect of the humped cam of Fig. 8, viz., a graduated increase of pitch angle to a maximum followed by a slight decrease to the normal autorotative flying value, but this effect may be obtained by the use of a rotor blade in which the mass centre is in advance of the mean aerodynamic centre of pressure. Typical of this is a blade having an unsymmetrical bi-convex profile, and constructed with its mass centered on its longitudinal axis.

The effect of this is illustrated in Fig. 15 which shows the blade hub and one rotor blade with its root articulation somewhat diagrammatically in isometric projection. In this figure $XOX^1$, $YOY^1$, $ZOZ^1$, are a conventional system of rectangular axes, of which the Z axis is the axis of rotation, the X axis is parallel to the flapping (or delta) pivot axis $\delta$—$\delta$, and the Y axis intersects the flapping pivot axis; the mean radial position of the blade, relative to the hub, lies in the Y—Z plane. The direction of rotation is represented by an arrow R and the longitudinal axis of the blade by $b$—$b$, the blade being in its mean radial position. For convenience in illustrating their chordwise separation, the mass centre $m$ and the mean aerodynamic centre of pressure $p$ are shown on the same transverse section of the blade S. On account of the upward coning of the blade about the flapping pivot axis represented by the angle between the axis $b$—$b$ and the Y axis, the centrifugal force F applied at $m$ may be resolved into the components $F_1$ acting along the axis $b$—$b$ and $F_2$ acting downwards at right angles thereto. As the mean aerodynamic centre of pressure $p$ does not coincide with the mass centre $m$, in the embodiment of Fig. 15, the aerodynamic lift acting upwards at $p$ constitutes with the component $F_2$ of the centrifugal force a couple acting about the axis $b$—$b$. On account of the inclination of the drag pivot axis $\alpha$—$\alpha$ to the blade axis $b$—$b$ at an angle other than 90°, this couple $LF_2$ will have a component acting about the $\alpha$ axis, and as the centre of pressure $p$ is behind the mass centre $m$, the direction of this couple will be that represented by the arrow A, and in the absence of counteracting forces, the couple A will rotate the blade about the drag pivot axis in a direction to decrease the pitch angle, bringing the blade section S into a displaced position such as $S^1$ shown in dotted lines. In this movement about the drag pivot the blade axis $b$—$b$ describes a conical path and the path of the blade section S is represented by the projected circle with its centre on $\alpha$—$\alpha$. The couple $LF_2$ will not move the blade about the drag pivot indefinitely in the pitch decreasing direction, as the displacement of the blade from its mean radial position will introduce a centrifugal restoring couple about the $\alpha$ axis. The blade will therefore be displaced slightly from the mean radial position into a position of equilibrium, under a given operating condition, in which the component A of the couple $LF_2$ is balanced by the centrifugal restoring couple.

The result of this arrangement is that an automatic correlation is established between the ratio thrust/centrifugal force and blade pitch angle, such that if the thrust increases relatively to the centrifugal force the pitching couple $LF_2$ is increased relatively to the centrifugal restoring couple and therefore the pitch angle is decreased. The effect of this is similar to that of the humped cam of Fig. 8 in the mechanically operated pitch changing means of the first embodiment of the invention for the following reason. The application of the starting torque with the blade pitch angle decreased enables excess of rotational speed to be imparted in virtue of the decreased rotational drag. When the starter clutch is disengaged and the pitch angle simultaneously increased, the excess kinetic energy of the rotor is utilised to obtain a temporary direct lift effect causing the aircraft to rise from the ground. At the beginning of this process the downward inflow through the rotor disc is nil and this gives rise to a temporary excess of thrust which disappears progressively as the downward inflow through the disc increases. The thrust is further decreased by the upward acceleration of the aircraft and reaches a minimum not when the upward velocity of the craft is a maximum but slightly later on account of the delay in building up the inflow. Concurrently expenditure of kinetic energy causes the speed of rotation to fall and the centrifugal force to decrease but the decrease of thrust after the peak value has been attained is more rapid than the decrease of centrifugal force and the ratio thrust/centrifugal force therefore decreases with a resulting increase of pitch angle. The increase of pitch angle tends to increase the thrust and the net result is a tendency to maintain the thrust at a useful positive value. Once in the air, the aircraft gathers forward speed under the action of its airscrew and the temporary direct lift regime passes over into the normal autorotative regime. In autorotative flight the thrust of the rotor is substantially equal to the weight of the aircraft, but during the temporary direct lift regime, the decrease of thrust which takes place brings the thrust to a value below the weight of the machine after the upward velocity of the aircraft has attained its maximum and is decelerating to the steady value obtaining in autorotative flight. For this reason, the ratio thrust/centrifugal force decreases to a minimum and then increases again to the steady value obtained in autorotative flight and consequently the blade pitch angle increases to a maximum value which is greater than that obtained in autorotative flight and thereafter falls to its normal flying value when steady autorotation is established.

It is important to note that the effect of dependence of the blade pitch angle on the ratio thrust/centrifugal force resulting from the combination of a rotor blade with its mass centre forward of its centre of pressure and a drag pivot inclined to the blade axis at an angle other than 90° may be obtained irrespective of the direction of the inclination of the drag pivot axis to the blade axis and of the plane in which such inclination is oriented. In other words, the α axis (or any other articulation pivot axis) may be inclined to the blade axis either outwardly and upwardly or outwardly and downwardly and need not necessarily be in the Y—Z plane but may be inclined to this plane at any angle and in any direction as far as the effect under discussion is concerned, this effect being obtainable (though to widely differing degrees, and therefore with differing results, depending upon the direction and extent of the obliquity) with any arrangement in which the blade axis is inclined at an angle other than 90° to a blade articulation pivot axis.

Figure 16:
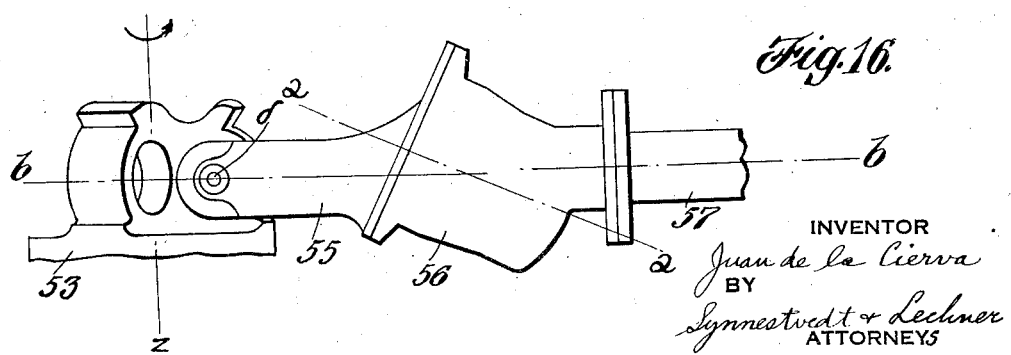
Fig. 16 is a somewhat diagrammatic view in side elevation, similar to Fig. 13, of the top of a rotor hub and blade root articulation according to another embodiment of said features of the invention.

This can be seen by inspection of structural Fig. 16, and the accompanying diagrammatic Fig. 16a which is a diagram similar to Fig. 15 omitting the structural parts and showing the axes only, but wherein the drag pivot axis α—α is inclined in the opposite direction to the blade axis b—b viz outwardly and downwardly instead of outwardly and upwardly. (This inclination may alternatively be described as a radial divergence of the pivot axis at the pressure side— sometimes termed "back face"—of the airfoil.) In this case also the couple $LF_2$ has a component acting about the α axis indicated by the arrow A operating in a direction to decrease the pitch, as diagrammatically indicated by the displaced position of the blade section S which is shown in dotted lines at $S^1$ as before. It will be seen that whereas in Fig. 15 the component A of couple $LF_2$ tends to cause the blade to lag from its normal radial position, in Fig. 16a the tendency of this component is to cause the blade to lead, but in both cases the tendency is to decrease the pitch angle.

However, since the normal flight pitch is positive, and since the arrangement of Figs. 16—16a gives an increase of pitch with application of driving torque, the entire range of pitch variation with this arrangement will normally be well above zero pitch. Thus the blade will float or maintain itself in equilibrium at a given angle of attack, which is positive, for a given set of conditions of speed, torque, thrust, centrifugal force, etc.; in a manner somewhat analogous to that already described with reference to Fig. 15, except that, with the drag hinge and other features as shown in Figs. 16 and 16a, the driving torque itself tends to increase the angle of attack rather than to decrease it.

The orientation of the drag pivot axis in the direction shown in Figs. 16 and 16a therefore will not automatically cause an increase of pitch angle when the starting torque is withdrawn, but other means may be utilised for this purpose, for example, a double drag hinge as described in my copending application for patent, Serial No. 59,293 (Patent 2,155,409), or a combination of the system described with reference to Figs. 15, 16, with a suitable modification of the mechanical pitch regulating system described with reference to Figs. 1 to 12.

Figs. 17 to 22 illustrate a modification of the system of Fig. 13 in which the required dependence of pitch angle on the ratio thrust/centrifugal force is obtained by utilising the movement of the blade on the flapping axis to effect changes of pitch angle. As the ratio thrust/centrifugal-force is approximately proportional to the coning angle, i. e., the inclination of the blade axis above the plane perpendicular to the rotational axis, namely the X—Y plane of Figs. 15, 16, the desired result will be achieved if the pitch angle decreases as the coning angle increases. This may be obtained by inclining the flapping axis δ—δ in the X—Y plane with respect to the blade axis b—b as shown in Figs. 17 to 22. Inclination of the δ axis to the blade axis in this plane causes the blade pitch angle to change with the flapping or coning angle. In order that the pitch angle shall vary in the right sense, i. e., decrease as the coning or flapping angle increases, the inclination of the axis must be such that the outer and rearward angle between the δ and b axes is greater than 90° as shown by double ended arrows in Figs. 17 and 20, the direction of rotation being indicated by the arrow R. Two arrangements of the respective inclinations of the δ and α axes to the blade axis are shown according to whether the mass centre of the blade is in advance of or behind the aerodynamic centre of pressure.

In the first arrangement, Figs. 17 to 19, the mass centre m lies in front of the centre of pressure p, in which case the pitching couple $LF_2$ is in the direction of the arrow P and as already shown in connection with Figs. 15 and 16a acts in conjunction with the inclination of the α axis to the blade axis b—b (and also the inclination to the blade axis of the δ axis, though to a smaller extent on account of the less pronounced inclination of the δ axis) to decrease the pitch angle when the thrust/centrifugal force ratio is increased and vice versa. The action of the pitching couple $LF_2$ therefore assist the pitch varying action of the flapping on the inclined δ pivot. For this reason the δ axis is inclined to the blade axis at an angle not greatly less than 90° and a pronounced inclination of the α axis to the b axis may be used. In this case an appreciable decrease of pitch angle is associated with a relatively small increase of coning angle and a lagging displacement about the α axis, as shown by the displaced position S' (chain dotted lines) of the blade section S (full lines) in Fig. 19.

For constructional reasons, however, it is easier to make a rotor blade with its mass centre rearwardly of the centre of pressure than one having its mass centre forwardly of the centre of pressure. According to an alternative embodiment of the invention, such a blade (i. e., with "rearward" mass centre) may be employed, in accordance with the following:

If the mass centre $m$ is behind the centre of pressure $p$, as in Figs. 20 to 22, the pitching couple $LF_2$ acts in the reverse direction (as shown by the arrow P) and tends to increase the pitch angle when the thrust/centrifugal force ratio is increased. This action therefore opposes the action of the flapping about the inclined $\delta$ pivot axis. For this reason, if reduction of pitch angle is to accompany an increase in the ratio thrust/centrifugal force, the $\delta$ axis is given a much more pronounced inclination to the blade axis $b$—$b$ and the $\alpha$ axis is inclined to the blade axis at an angle approaching more nearly to a right-angle than in the case shown in Figs. 17 to 19.

It should be understood that a more pronounced inclination of the $\delta$ axis tends to increase the positive pitching effect in question, yet, as regards the $\delta$ axis, the effect of the pitching couple $LF_2$ is quite small relatively to the pitch reducing effect of the flapping or coning angle and that the latter effect may therefore be made to predominate.

In the case of Figs. 20 to 22 it will be seen (as shown in Fig. 22) that for a given change of blade pitch angle a much more pronounced increase of flapping angle is required than in the previous case (see Fig. 19) and that it is associated with a leading displacement about the $\alpha$ axis.

Since, with certain of the blade sections (especially of the unsymmetrical sections), there will be a chordwise centre of pressure travel, there may be a variable pitching couple for different angles of attack, but the couple may be kept from changing sign, within a given range of angles, by having sufficient chordwise separation between the centre of mass and the mean centre of pressure, either in the sense of Fig. 19 or in the sense of Fig. 22.

Fig. 23 illustrates the effect of flexibility of the blade in the YZ plane (as defined in Fig. 15) when combined with means causing the pitch angle to vary inversely with the thrust/centrifugal force ratio, e. g., the inclination of the flapping pivot axis in the XY plane, as described with reference to Figs. 17 to 22, or the alternative means hereinafter described with reference to Fig. 24.

Fig. 23 shows diagrammatically the hub member 53, flapping pivot $\delta$ and rotor blade 70, referred to the conventional rectangular axis system. The other structural elements including the drag pin are omitted as their presence is immaterial to the effect of blade flexibility in the flapping plane. In autorotative flight the resultant lift L and the resultant centrifugal force F are applied very nearly at the same point and the bending moment on the blade in the YZ plane is therefore small and the blade takes up the configuration shown in full lines.

When however the rotor is acting temporarily as a lifting screw the point of application of the resultant lift L' is displaced towards the tip of the blade so that a considerable bending moment is applied to the blade in the YZ plane, tending to produce flexure with convexity downwards. At the same time the displacement of the lift towards the tip tends to increase the coning angle so that the blade takes up the configuration indicated in chain dotted lines. If the blade were substantially rigid the increased coning angle in the direct lift regime would cause the pitch angle to be less than in the autorotative regime, whereas it is required that in the later stages of the direct lift regime, when the thrust has fallen appreciably from its peak value, the pitch angle be greater than in autorotative flight. If the blade is sufficiently flexible however the increase of mean coning angle consequent on the displacement of the resultant lift towards the tip of the blade is largely neutralised by the flexure of the blade, as the displacement about the flapping pivot is determined by the tangent on the neutral flexural axis at the root of the blade. In Fig. 23 the tangent at the root of the blade axis in its flexed position (chain dotted lines) is indicated by the dotted line $t$—$t$ and it will be seen that it is substantially coincident with the blade axis in its unflexed position (full lines). The result of this is that in a rotor having means for varying the pitch angle inversely with the upward displacement about the flapping pivot the deficiency of thrust/centrifugal force ratio in the later stages of the direct lift regime is able to give rise to an increase of pitch angle above the normal value in autorotative flight in spite of the increase of mean coning angle consequent on the displacement of the lift towards the blade tip.

The required flexibility of the blade in the YZ plane may be obtained by using principal structural elements of sufficient inherent flexibility in this plane or by use of a jointed blade construction as described in Paul H. Stanley's copending application for patent, Serial No. 740,463, filed August 18, 1934, which issued as Patent No. 2,-108,417 on February 15, 1938.

The required dependence of pitch angle on flapping may also be obtained in another way by inclining the axis of the flapping pivot ($\delta$) in the plane perpendicular to the blade axis in combination with an inclination of the drag pivot axis ($\alpha$) to the blade axis at an angle other than 90°. If the $\alpha$ axis is inclined upwardly and outwardly to the blade axis (as in Figs. 13 and 15) the $\delta$ axis must be inclined rearwardly and upwardly with reference to the direction of rotation (as shown in Figs. 24 and 24$a$, the latter of which is a diagrammatic representation in isometric projection of the various axes, the direction of rotation being indicated by an arrow). As before, the diagram is referred to the conventional rectangular axis system, the several reference axes being positioned as in Fig. 15. In its mean radial position the blade lies along the Y axis, which is intersected by the flapping pivot axis at $\delta$ and by the drag pivot axis at $\alpha O$, the mass centre of the blade being at $m_0$. The axes $\delta x$ and $\delta z'$ define a plane parallel to the XZ plane and the $\delta$ axis is contained in this plane, being inclined to the XY plane at an angle $\delta_2$ upwardly at its rear end.

Displacement about the flapping axis brings the blade into the position defined by the dotted line $\delta \alpha m$, the displaced position of the intersection of the blade with the drag pivot axis being indicated at $\alpha$, and the displaced position of the mass centre being indicated at $m$. In the absence of other disturbing forces displacement on the flapping pivot introduces a displacement upon the drag pivot by reason of the action of the centrifugal force which tends to make the distance $Om'$ a maximum, $m'$ being the projection of the mass centre $m$ on the XY plane and $Om'$ the projected line of action of the centrifugal force. The projection on the XY plane of the point $\alpha$ is at $\alpha'$ and of the blade with its drag link ($\delta\alpha$) is given by the line $\delta\alpha'm'$ and it will be seen that an upward displacement on the flapping pivot gives rise to a lagging displacement about the drag pivot. For convenience in showing the displacement on the drag pivot the position the blade would have if there were no displacement on the drag pivot and its projection on the XY plane are indicated by the lines $\delta\alpha m_1$ and $\delta\alpha'm'_1$.

As a lagging displacement about the drag pivot, which is inclined upwardly and outwardly to the blade axis, is associated with a decrease of pitch angle, it follows that with this arrangement an increase of flapping angle gives rise to a decrease of pitch as required.

The above described effect is however subject to certain limitations arising from the fact that the rotor hub, when the drive is disconnected, is freely rotatable on its axis member and has a negligible moment of inertia. These limitations may be briefly expressed in the statement that the effect referred to is only obtained universally if the flapping pivots are offset from the rotational axis but that if the flapping pivots intersect the rotational axis variation of the blade pitch angle is only associated with "flapping" of the blades, i. e., with unequal displacements about the flapping pivots such that the mean angular displacement of all the blades is unaltered and not with "coning," i. e., with a variation of the mean angular displacement of all the blades on their flapping pivots. This effect is illustrated in Figs. 25 to 28, which illustrate in plan, i. e., projected on the XY plane, various configurations of a rotor, which for convenience is shown as a two-bladed rotor, although the results are generally valid for any number of blades.

Fig. 25 shows the effect of pure coning in which the blades are displaced equally and oppositely on their respective flapping pivots $\delta$, $\delta^a$. On account of the inclination in the XZ plane of the flapping pivot axes the drag links are displaced on the $\delta$ pivots in the XY plane, as shown by the projections $\delta\alpha l$ and $\delta\alpha\alpha^l a$ and displacements of the blades about the $\alpha$ pivots take place such that the line joining the mass centres passes through the rotational axis, projected positions on the XY plane of the mass centres being shown at $m'$ and $m'^a$.

In the case of pure coning shown in Fig. 25 the leading and/or lagging displacements of the drag links and blade axes are equal and of the same sign, whereas in the case of pure flapping (Fig. 26) these displacements are equal and opposite. Where flapping and coning are both present a configuration somewhat as shown in Fig. 27 is attained, the displacements being unequal and of the same or opposite sign according as coning or flapping predominates.

Fig. 28 shows the configuration in the case in which the flapping axes intersect the rotational axis, as indicated at $\delta$ when pure coning only takes place. In this case from the condition that the line $m'$—$m'^a$ should pass through the origin it results that there is no displacement about the drag pivots, so that (when projected on the XY plane) the points $m'$, $\alpha'$, $\delta$, $\alpha'^a$ and $m'^a$ are co-linear.

In these Figures 25 to 28 the axes of reference are assumed to rotate about the axis with uniform angular velocity corresponding to the rotational speed of the rotor and therefore the mass centres of the blades remain substantially on the Y axis and the rotor hub represented by the line $\delta$, $\delta^a$ is displaced relatively to the X and Y axes when displacements about the flapping pivots occur.

In Fig. 28 the displacement of the rotor hub takes place as in Fig. 25, but it is not apparent from the diagram on account of the fact that the $\delta$ or flapping pivot passes through the origin.

On the other hand the effect of pure flapping (as shown in Fig. 26) is obviously not altered by making the points $\delta$, $\delta^a$ coincide with the origin. In this case however the displacements about the $\alpha$ pivots are equal and opposite and the resulting changes in pitch angle are also equal and opposite. The effect of this is merely to modify the flapping of the blades and therefore the inclination to the rotational axis of the plane containing the path swept by the rotor blade tips and there is no variation of the mean blade pitch angle. Thus, to effect variation of the mean blade pitch angle, under conditions of no torque, the arrangement illustrated in Figs. 24 and 24a is only effective if the flapping pivots are offset from the rotational axis.

With further reference to Figs. 29 and 31 it will be noticed that the clutch-operating lever 36 is shown as connected directly by the flexible transmission device 33, 34 to the hand-lever 35. In this case the necessary delay in the initial increase of blade pitch angle for avoiding an excessive "peak" thrust must be provided by the use of a damping device applied to the drag articulation as shown in Fig. 13. The showing of this device on figures of the small scale of Nos. 29 to 31 would not add to the clarity of the drawing and it has therefore been omitted.

It is equally possible however to delay and regulate the initial increase of blade pitch angle by effecting the disengagement of the clutch automatically through a damping device and leaving the drag pivots free. In this case clutch-operating mechanism of the kind shown in Fig. 7 may be incorporated, omitting of course the cam slot 43 and pitch-changing mechanism 44, 45.

Regulation of the blade pitch angle in the desired manner throughout the whole of the take-off until autorotation is established may be obtained by combining a damped disengagement of the clutch, e. g., as illustrated in Fig. 7 with a free drag articulation incorporating any of the expedients giving independence of the blade pitch angle on the thrust/centrifugal force ratio as illustrated for instance in Figs. 15 to 22 and 24 to 28, the rotor blades being constructed to have adequate flexibility in the vertical plane as above described with reference to Fig. 23.

In the former case in which the clutch disengagement is undamped, it is preferably effected by means of a quick release device of the kind shown at 37—42 in Fig. 7, although this is not indicated on Fig. 29.

It is desirable in an aircraft constructed in accordance with the present invention and capable of direct take-off that the line of resultant thrust of the rotor should pass well behind the centre of gravity of the aircraft at the beginning of the taking-off process, in order to prevent the aircraft rearing up and moving backwards at the start of the process, so that sufficient forward speed for autorotation is not attained before the temporary direct lift effect has expended itself.

By having the thrust line of the rotor well behind the centre of gravity the aircraft tends to tip forward when it leaves the ground and the thrust therefore acquires a forward component tending to assist the propulsive airscrew to impart the necessary forward speed for attaining autorotative flight. This is illustrated in Fig. 32, in which the thrust line of the airscrew is shown at T and the resultant thrust line of the rotor at C, and it will be seen that the path swept by the rotor blades is given an exaggerated forward tilt at the start of the motion such that the thrust line C passes behind the centre of gravity $g$ by a distance $h$ which is not less than 0.14 of the distance $k$ of the centre of gravity $g$ below the centre O of the rotor. The line of action of the weight of the aircraft is shown at W.

As soon as the aircraft leaves the ground the path swept by the blade tips is tilted back by the action of the pilot on the controls. At the same time forward speed is being gained, so that the thrust line of the rotor C takes up a position passing close to and possibly slightly in front of the centre of gravity $g$ by the time the aircraft has nearly reached the top of its "jump" and is about to attain autorotative flight, as shown in the upper part of Fig. 32. The path of the aircraft is indicated by a dotted line $q$.

What I claim is:

1. In an aircraft of the character described having an autorotative sustaining rotor, a rotor hub, blades mounted on the hub and capable of variation of pitch angle, driving means, including a clutch, for overspeeding the rotor with the blades at decreased pitch angles, and mechanism for controllably increasing the blade pitch angles to utilize the excess kinetic energy of the overspeeding for obtaining a direct take-off of the craft, said mechanism including means automatically operating under the influence of cutting down the driving torque, as by disconnection of said clutch, to regulate the rate of change of blade pitch angle during the period of changing regime of air flow from the time of disengagement of the clutch until autorotation is established.

2. In an aircraft, the construction of claim 1 including a damped spring device regulating the rate of change of blade pitch angle during the period of changing regime of air flow from the time of disengagement of the clutch until autorotation is established.

3. In an aircraft, the construction of claim 1 including interlocking means for the clutch and said automatic means providing for actuation of the latter when the former is disengaged.

4. In an aircraft, the construction of claim 1 including a timing device, together with means interconnecting the clutch and the timing device whereby the latter controls rate of disconnection of the former.

5. In an aircraft, the construction of claim 1 together with means for varying the fore and aft inclination of the plane containing the path swept by the tips of the rotor blades so constructed and arranged that the maximum forward inclination of the said path of the blade tips brings the thrust line of the rotor during the take-off, i. e., before forward speed is attained, to a position passing behind the centre of gravity of the aircraft by a distance not less than 0.14 of the height of the centre of the rotor above the said centre of gravity.

6. In an aircraft, the construction of claim 1 together with longitudinal flying control means for the craft, and interlocking means connected therewith and with the clutch providing for disconnection of the clutch upon rearward movement of the control from its forwardmost position.

7. In an aircraft, the construction of claim 1 including pivot means for mounting the blades on the hub having pivot axes angled at such obliquity with respect to the longitudinal axes of the blades as to automatically regulate, under the influence of cutting down the driving torque, the rate of change of blade pitch angle during the period of changing regime of air flow from the time of disengagement of the clutch until autorotation is established.

8. In an aircraft, the construction of claim 7, further including a device for damping blade pitch change movements throughout that part only of the range in which the blade pitch angle is less than in normal autorotation, whereby to permit undamped oscillations of the blades about their means radial position within the normal amplitudes of such oscillations experienced in flight.

9. In an aircraft, the construction of claim 1 including a timing device operating to regulate the rate of change of blade pitch angle during the period of changing regime of air flow from the time of disengagement of the clutch until autorotation is established.

10. In an aircraft, the construction of claim 9 wherein the timing device incorporates a cam providing an increase of pitch angle to a predetermined maximum and a subsequent decrease to a value within the autorotative range of pitch angles.

11. In an aircraft, a sustaining rotor including autorotatable blades and means for varying the pitch between a substantially no-lift pitch and a positive pitch, driving means for overspeeding the rotor prior to take-off with the blades in no-lift pitch, means for disconnecting the driving means, means for progressively and controllably raising the blade pitch for direct take-off, and a timing device automatically effecting a sequential operation of the last two mentioned means.

12. In an aircraft, a sustaining rotor comprising autorotative wings or blades, disconnectible power means for imparting rotative motion thereto prior to take-off, means for increasing the blade pitch angle on disconnection of the power means from about zero to a positive value within the autorotative range, slippable clutch means for disconnecting the power means and an automatic timing device coupled with the clutch and interposing a slipping period of about 0.3 second between full engagement and complete disengagement.

13. In an aircraft, a sustaining rotor comprising autorotative wings or blades, disconnectible power driving means for imparting rotative motion or torque thereto prior to take-off, means mounting the blades for variation of effective pitch whereby the blade pitch angle may be reduced during application of the starting torque, and mechanism operating in response to cutting off of the driving torque to raise the pitch angle above the normal flight range of angles and thereafter reduce the same to within said range, including automatically-acting means regulating the pitch angle variation at such predetermined rate as to minimise fluctuations in the trust delivered by the rotor during the take-off.

14. In an aircraft, a sustaining rotor comprising autorotative wings or blades, disconnectible power driving means for imparting rotative motion or torque thereto prior to take-off, means mounting the blades for variation of effective pitch whereby the blade pitch angle may be reduced during application of the starting torque, and mechanism operating in response to cutting off of the driving torque to raise the pitch angle for effecting the take-off first at a relatively rapid rate of pitch increase until the rotor lift at least equals the weight of the aircraft and thereafter at a more gradual rate.

15. In an aircraft having a sustaining rotor comprising autorotative wings or blades and disconnectible means for temporarily imparting a starting torque to said rotor for take-off purposes, mechanism automatically operative under the influence of torque variation to decrease the blade pitch angles during application of the starting torque and to subsequently increase the same, and mechanism for automatically varying the rate of change of the pitch angles from an initial relatively high rate of change to a subsequent lower rate of change.

16. In an aircraft, a sustaining rotor comprising a hub, autorotative blades and pivot mechanism mounting the blades on the hub, disconnectible power means for imparting rotation to the rotor prior to take-off, means for increasing the blade pitch angle on disconnection of the power means, restraining means predeterminedly regulating the rate of initial pitch increase from about zero at least until the minimum desired autorotative value is attained, means thereafter rendering said restraint inoperative at normal flight values of pitch, and means effecting a reduction of pitch angle upon an increase of the lift relatively to the centrifugal force of the blades.

17. In an aircraft, a sustaining rotor comprising a hub, autorotative blades and pivot mechanism mounting the blades on the hub, disconnectible power means for imparting rotation to the rotor prior to take-off, means for increasing the blade pitch angle on disconnection of the power means, restraining means predeterminedly regulating the rate of initial pitch increase from about zero at least until the minimum desired autorotative value is attained, means thereafter rendering said restraint inoperative at normal flight values of pitch, and the rotor blades having their mass centres situated generally forward of their mean centres of pressure at all blade incidence angles within the normally utilized autorotational range of such incidence angles.

18. In an aircraft having an autorotative sustaining rotor, means for applying a driving torque to the rotor including disconnection means, means varying the rotor blade pitch for effecting direct take-off upon disconnection of the drive, a longitudinal flight control for the craft, and means operating said disconnection means upon rearward movement of said flight control from an extreme forward position.

19. In an aircraft having an autorotative sustaining rotor, means for applying a driving torque to the rotor including a disconnecting device, means varying the rotor blade pitch for effecting direct take-off upon disconnection of the drive, a longitudinal flight control for the craft latchable in an extreme forward position, and means acting to unlatch said control upon actuation of said disconnecting device.

20. In an aircraft sustaining rotor, a hub, an autorotative blade at least the outer portion of which is capable of substantial relative upward flexing with respect to an inner portion, and pivot mechanism securing the root end of the blade to the hub including a pivot axis positioned for flapping of the blade but set at an angle other than 90° to the longitudinal axis of the blade, and said blade having its sectional centre of mass off-set with relation to its mean aerodynamic centre of pressure so as to cause the blade to assume a reduced pitch during the application of a starting torque.

21. In an aircraft, a sustaining rotor including a hub, and a blade mounted thereon with freedom for pitch change movement substantially about its longitudinal axis between a position of substantially zero lift incidence and a position of appreciable positive lift incidence, disconnectible means for driving the rotor, means for setting the blade at substantially zero lift incidence during application of the drive, means operative by virtue of disconnection of the drive for moving the blade to a positive lift incidence position, and means for moving the blade to and maintaining the blade at an intermediate positive lift incidence position.

22. In an aircraft, a sustaining rotor including a hub, and a blade mounted on the hub for movement to different pitch positions including a predetermined fixed position intermediate the limits of the range, disconnectible means for driving the rotor with the blade in low pitch position below said predetermined fixed position to store energy in the rotor for direct take-off, means automatically operative upon disconnection of the drive for moving the blade to a high pitch position above said predetermined fixed position, and means for moving the blade from the high pitch position to said predetermined fixed position for normal flight.

23. In an aircraft, a sustaining rotor including a hub, and a blade mounted thereon with freedom for pitch change movement substantially about its longitudinal axis between a position of substantially zero lift incidence and a position of appreciable positive lift incidence, disconnectible means for driving the rotor, a pilot's control for said means, means automatically operative upon movement of the pilot's control to connect the drive for setting the blade at substantially zero lift incidence, means for moving the blade to a positive lift incidence when the drive is disconnected, and means for moving the blade to and maintaining the blade at an intermediate positive lift incidence position.

24. In an aircraft, a sustaining rotor including a hub, and a blade mounted thereon with freedom for pitch change movement substantially about its longitudinal axis between a position of substantially zero lift incidence and a position of appreciable positive lift incidence, disconnectible means for driving the rotor, a pilot's control for said means, means automatically operative upon movement of the pilot's control to connect the drive for setting the blade at substantially zero lift incidence, means automatically operative upon movement of the pilot's control to disconnect the drive for moving the blade to a positive lift incidence position, and means for moving the blade to and maintaining the blade at an intermediate positive lift incidence position.

25. In an aircraft, a revoluble thrust-producing system including a hub, generally radially disposed airfoil blade pivotally secured to and carried by said hub by a corresponding single pitch-varying blade-root pivot carried by a blade-flapping pivot, the axial line of pivotation of said pitch-varying blade-root pivot being fixed in relation to the longitudinal axis of the blade-root and passing outwardly from said hub on the back or pressure side of the airfoil blade in a generally radial direction and diverging from the airfoil blade as it goes outwardly from said hub, whereby said airfoil blade will tend to float or maintain itself at a predetermined angle of attack (about said pitch-varying blade-root pivot) when revolving at a constant speed and whereby said angle of attack will be increased by increase in driving torque and decreased with decrease in driving torque.

26. In an aircraft, a revoluble thrust-producing system including a hub, a generally radially disposed airfoil blade pivotally secured to and carried by said hub by a trunnion-like pitch-varying blade-root pivot carried by a blade-flapping pivot, the axial line of pivotation of said pitch-varying blade-root pivot being fixed in relation to the longitudinal axis of the blade-root and passing outwardly from said hub on the back or pressure side of the airfoil blade in a generally radial direction and diverging from the airfoil blade as it goes outwardly from said hub, whereby said airfoil blade will tend to float or maintain itself at a predetermined angle of attack, about said pitch-varying blade-root pivot, when revolving at a constant speed and whereby said angle of attack will be increased by increase in driving torque and decreased with decrease in driving torque.

27. In an aircraft, a sustaining rotor comprising a hub disposed on a generally upright axis, an aeroform blade rotatable about said axis, mechanism securing said blade on said hub including a flapping pivot and a pitch-change pivot having its axis substantially coaxial with the longitudinal blade axis and providing for blade movement between different pitch positions, an automatic pitch altering device normally urging the blade, when rotating, in one direction of pitch change, and a controllable pitch altering device for positively moving the blade in the opposite direction of pitch change.

28. In an aircraft, a sustaining rotor comprising a hub disposed on a generally upright axis, an aeroform blade arranged for rotation about said axis, mechanism mounting the blade on said hub with freedom for movement about a flapping axis, and means whereby the effective pitch of said blade may be varied while maintaining said flapping freedom, an automatic pitch altering device constructed to exert a pressure normally effective to cause blade pitch change in one direction irrespective of rotor rotation, and a releasable manually controllable pitch altering device for positively effecting blade pitch change in the opposite direction including operating connections which free said automatic device for operation when the manual device is released.

29. In an aircraft, a sustaining rotor comprising a hub disposed on a generally upright axis, an aeroform blade arranged for rotation about said axis, mechanism mounting the blade on said hub with freedom for movement about a flapping axis, and means whereby the effective pitch of said blade may be varied while maintaining said flapping freedom, an automatic pitch altering device constructed to exert a pressure normally effective to cause blade pitch change in the direction of increased pitch irrespective of rotor rotation, and a releasable manually controllable pitch altering device for positively effecting blade pitch change in the direction of decreased pitch, including operating connections which free said automatic device for operation when the manual device is released.

30. In an aircraft sustaining rotor adapted to accommodate or compensate for differential flight forces, a hub, an elongated aeroform sustaining blade having means for variation of its effective pitch and adapted for autorotation, mechanism connecting said blade to said hub including pivot means providing for blade swinging movements and constructed and arranged to effect a reduction in blade pitch when the blade swings away from a given operating position relative to said hub, said blade having a bi-convex sectional profile and constructed with its mass centre substantially on the longitudinal axis of the blade.

31. In an aircraft sustaining rotor, a hub, an elongated sustaining blade, capable of autorotation, variable as to pitch and arranged for movement relative to said hub in the flapping and drag senses, and mechanism connecting said blade to said hub including a plurality of pivots providing for such blade movements and constructed and arranged to effect a reduction in blade pitch when the blade moves rearwardly and upwardly from a given operating position relative to said hub.

32. A construction according to claim 31, wherein the blade is constructed and configured to have its sectional mass centre forwardly of its mean aerodynamic centre of pressure.

33. In an aircraft sustaining rotor, a hub, an elongated sustaining blade, capable of autorotation, variable as to pitch and arranged for movement relative to said hub in the flapping and drag senses, and mechanism connecting said blade to said hub including a plurality of pivots providing for such blade movements and constructed and arranged to effect a reduction in blade pitch when the blade moves forwardly and upwardly from a given operating position relative to said hub.

34. A construction according to claim 33, wherein the blade is constructed and configured to have its sectional mass centre rearwardly of its mean aerodynamic centre of pressure.

35. In an aircraft sustaining rotor, a hub, an autorotative blade, and pivot mechanism mounting the blade on the hub comprising a flapping pivot axis angled to effect blade pitch variation upon flapping and a drag pivot axis angled to effect blade pitch variation upon lag-and-lead oscillation.

36. In an aircraft sustaining rotor, a hub, an autorotative blade, and pivot mechanism mounting the blade on the hub comprising a flapping pivot axis angled to effect, when the blade is substantially radial, a reduction in blade pitch angle upon upward flapping and a drag pivot axis angled to effect blade pitch variation upon lag-and-lead oscillation.

37. In an aircraft sustaining rotor, a hub, an autorotative blade, and pivot mechanism mounting the blade on the hub comprising a flapping pivot axis angled to effect a reduction in blade pitch angle upon upward flapping and a drag pivot axis angled to effect a reduction in blade pitch angle upon lagging oscillation.

38. In an aircraft sustaining rotor, a hub, an autorotative blade, and pivot mechanism mounting the blade on the hub comprising a flapping pivot axis angled to effect a reduction in blade pitch angle upon upward flapping and a drag pivot axis angled to effect a reduction in blade pitch angle upon lagging oscillation, the centre of mass of said blade being positioned forward of the mean aerodynamic center of pressure of the blade.

39. In an aircraft sustaining rotor, a hub, an autorotative blade, and pivot mechanism mounting the blade on the hub comprising a flapping pivot axis angled to effect a reduction in blade pitch angle upon upward flapping and a drag pivot axis angled to effect a blade pitch angle reduction upon a lagging oscillation, the centre of mass of said blade being positioned behind the mean aerodynamic centre of pressure of the blade, and the angularity of the flapping pivot axis being such that its blade pitch varying effect predominates over that of the drag pivot.

40. In an aircraft sustaining rotor, a hub, an autorotative blade, and pivot mechanism mounting the blade on the hub comprising a flapping pivot axis angled to effect a reduction in blade pitch angle upon upward flapping and a drag pivot axis angled to effect a reduction in blade pitch angle upon lagging oscillation, the blade being of a profile providing a chordwise center of pressure travel with change of pitch angle, and the centre of mass of said blade being positioned forward of the most forward position of the centre of pressure of the blade for blade angles of incidence within the normal autorotative range.

41. In an aircraft sustaining rotor, a hub, an autorotative blade and pivot mechanism mounting the blade on the hub comprising a flapping pivot axis angled with reference to the plane perpendicular to the rotational axis and offset from the rotational axis and a drag pivot axis angled obliquely to the longitudinal blade axis to effect a reduction of blade pitch angle on an upward flapping of the blade without displacement of the blade centre of inertia from the mean radial position.

42. In an aircraft sustaining rotor, a hub, an autorotative blade, and pivot mechanism mounting the blade on the hub comprising a flapping pivot axis offset from the rotational axis and angled upwardly and towards the trailing edge and a drag pivot axis angled upwardly and outwardly to the blade axis.

43. In an aircraft sustaining rotor, a hub, an autorotative blade, and pivot mechanism mounting the blade on the hub comprising a flapping pivot axis angled to effect a reduction in blade pitch angle upon upward flapping and a drag pivot axis angled to effect a reduction in blade pitch angle upon a leading oscillation.

44. In an aircraft sustaining rotor, a generally upright hub, a blade radiating therefrom, and pivot mechanism connecting said blade to the hub including a pivot having its axis lying substantially in the plane of the blade and making an acute angle with the longitudinal axis of the blade at the leading side thereof with reference to the direction of rotation, and a second pivot positioned with its axis approximately upright.

45. In an aircraft sustaining rotor, a generally upright hub, a blade radiating therefrom, and pivot mechanism connecting said blade to the hub including a pivot having its axis lying substantially in the plane of the blade and, when the blade is substantially radial, making an acute angle with the longitudinal axis of the blade at the leading side thereof with reference to the direction of rotation, and a second pivot positioned with its axis approximately upright and located outboard of said first mentioned pivot.

46. In an aircraft sustaining rotor, a generally upright hub, a blade radiating therefrom, and pivot mechanism connecting said blade to the hub including a pivot having its axis lying substantially in the plane of the blade and making an acute angle with the longitudinal axis of the blade at the leading side thereof with reference to the direction of rotation, and a second pivot lying in a plane containing the rotor axis and the longitudinal blade axis and inclined slightly outwardly at its upper end.

47. In an aircraft sustaining rotor, a generally upright hub, a blade radiating therefrom, and pivot mechanism connecting said blade to the hub including a pivot having its axis lying substantially in the plane of the blade and making an acute angle with the longitudinal axis of the blade at the leading side thereof with reference to the direction of rotation, and a second pivot lying in a plane containing the rotor axis and the longitudinal blade axis and inclined slightly outwardly at its upper end, said blade having its sectional centre of mass located rearwardly of its mean aerodynamic centre of pressure.

48. In an aircraft sustaining rotor, a generally upright hub, a blade radiating therefrom, and pivot mechanism connecting said blade to the hub including a flapping pivot the axis of which viewed in plan is inclined to form an angle slightly less than a right angle with respect to the longitudinal blade axis at the leading edge of the blade and a second or drag pivot adapted for blade pitch variation and having its axis extending upwardly and outwardly to form a slight angle with the longitudinal blade axis at the upper side thereof.

49. In an aircraft sustaining rotor, a generally upright hub, a blade radiating therefrom, and pivot mechanism connecting said blade to the hub including a flapping pivot the axis of which viewed in plan is inclined to form an angle slightly less than a right angle with respect to the longitudinal blade axis at the leading edge of the blade and a second or drag pivot adapted for blade pitch variation and having its axis extending upwardly and outwardly to form a slight angle with the longitudinal blade axis at the upper side thereof, said blade having its sectional centre of mass forward of its mean aerodynamic centre of pressure.

50. In an aircraft sustaining rotor, a rotor hub, an aeroform rotor blade arranged for variation of effective pitch, and mechanism mounting said blade on said hub with freedom for oscillating movement in the general path of rotation and adapted to effect an increase of the blade pitch angle upon such oscillating movement of the blade in a lagging direction, the structure of said blade having its mass centre nearer the leading edge of the blade than is the mean aerodynamic centre of pressure.

51. In an aircraft sustaining rotor, a rotor hub, an aeroform rotor blade arranged for variation of effective pitch, and mechanism mounting said blade on said hub with freedom for movement generally transverse the path of rotation and adapted to effect a decrease of the blade pitch angle upon movement of the blade in an upward direction, the structure of said blade having its mass centre nearer the leading edge of the blade than is the mean aerodynamic centre of pressure.

52. In an aircraft sustaining rotor, a rotor hub, an aeroform rotor blade arranged for variation of effective pitch, and mechanism mounting said blade on said hub with freedom for movement generally transverse the path of rotation and adapted to effect a decrease of the blade pitch angle upon upward flapping movement or coning of the blade, the structure of said blade being of such intrinsic flexibility in the flapping plane that the increase of upward coning angle and the flexure of the blade, both occurring upon a radially outward displacement of the centre of pressure, tend to set up opposite displacements of the root of the blade in the flapping direction which displacements largely neutralize one another, whereby variation of pitch angle from this cause is minimized.

53. In an aircraft capable of substantially vertical take-off and descent, a sustaining rotor rotatable about a generally upright axis and adapted to accommodate or compensate for differential flight forces and having means of direct rotor control effective in vertical flight, comprising an elongated aeroform sustaining blade, capable of autorotation at positive pitch, said blade having a root connection adapted to mount the blade at a point on its longitudinal axis, said connection incorporating means for varying the effective pitch of the blade by movement about an axis approximately intersecting the axis of rotation, said blade having a bi-convex profile and a construction providing flexibility in the direction transverse to its rotational path with freedom to yield under varying thrust, the blade further having its mass center substantially on said longitudinal axis.

54. In an aircraft sustaining rotor rotatable about an upright axis and constructed for yielding in the flapping sense sufficiently to accommodate differential lift effects due to translational flight, an elongated aeroform sustaining blade, capable of autorotation, having a root connection adapted to mount the blade at a point on its longitudinal axis, said connection including a pitch-varying pivot whose axis approximately intersects the axis of rotation, said blade having a bi-convex profile and being of a construction providing flexibility in the flapping sense and having its sectional mass centre located on said longitudinal axis.

55. In an aircraft sustaining rotor adapted to accommodate or compensate for differential flight forces, an elongated aeroform sustaining blade, capable of autorotation, having a blade-swinging pivot whose axis intersects the general axis of rotation to provide for up and down blade-swinging and a pitch-varying pivot disposed in a plane approximately containing the longitudinal axis of the blade and the axis of rotation, and being of a profile and structure providing a mass centre location for the blade substantially on said longitudinal axis.

56. In an aircraft sustaining rotor adapted to accommodate or compensate for differential flight forces, an elongated aeroform sustaining blade, capable of autorotation, having a blade-swinging pivot whose axis intersects the general axis of rotation to provide for up and down blade-swinging and a pitch-varying pivot disposed in a plane approximately containing the longitudinal axis of the blade and the axis of rotation, and having a bi-convex profile and being of a structure providing a mass centre location for the blade substantially on said longitudinal axis.

57. In an aircraft sustaining rotor adapted to accommodate or compensate for differential flight forces, an elongated aeroform sustaining blade, capable of autorotation, having a blade-swinging pivot whose axis intersects the general axis of rotation to provide for up and down blade-swinging and a pitch-varying pivot disposed in a plane approximately containing the longitudinal axis of the blade and the axis of rotation, and having an unsymmetrical bi-convex profile and being of a structure providing a mass centre location for the blade substantially on said longitudinal axis.

58. In an aircraft sustaining rotor adapted to accommodate or compensate for differential flight forces, an elongated aeroform sustaining blade, capable of autorotation, having a blade-swinging pivot whose axis intersects the general axis of rotation to provide for up and down blade-swinging and a pitch-varying pivot disposed in a plane approximately containing the longitudinal axis of the blade and the axis of rotation, and being of a structure and profile providing a mass centre location and a mean aerodynamic center of pressure location which are separated, chordwise, from each other.

59. In an air craft sustaining rotor adapted to accommodate or compensate for differential flight forces, an elongated aeroform sustaining blade having means for variation of its effective pitch and adapted for autorotation, said blade having an unsymmetrical bi-convex profile and having its mass centre forward of its mean aerodynamic centre of pressure.

60. In an aircraft, a sustaining rotor adapted to accommodate or compensate for differential flight forces, an elongated aeroform sustaining blade, capable of autorotation, having a blade-swinging pivot whose axis intersects the general axis of rotation to provide for up and down blade-swinging and a pitch-varying pivot disposed in a plane approximately containing the longitudinal axis of the blade and the axis of rotation, and being of a profile and structure providing a mass centre location for the blade substantially on said longitudinal axis, and means for controllably varying the path of rotation of the blade to maneuver the aircraft.

JUAN DE LA CIERVA.

REFERENCES CITED

The following references are of record in the file of this patent:

UNITED STATES PATENTS

| Number | Name | Date |
|---|---|---|
| 1,919,089 | Breguet | July 18, 1933 |
| 1,272,846 | Perry | July 16, 1918 |
| 1,927,966 | Vaughn | Sept. 26, 1933 |
| 2,021,470 | Upson | Nov. 19, 1935 |
| 1,811,303 | Cierva | June 23, 1931 |
| 1,975,118 | Moodie | Oct. 2, 1934 |
| 1,903,009 | Myers | Mar. 28, 1933 |
| 1,921,839 | Rawson | Aug. 8, 1933 |
| 1,673,232 | Cierva | June 12, 1928 |
| 2,000,904 | Pecker | May 14, 1935 |
| 1,435,190 | Leggelo | Nov. 14, 1922 |
| 1,507,513 | Perrin | Sept. 2, 1924 |
| 1,777,630 | Vaughn | Oct. 7, 1930 |

FOREIGN PATENTS

| Number | Country | Date |
|---|---|---|
| 32,011 | France | Mar. 22, 1927 |
| | (Addition to No. 608,650) | |
| 16,621 | Great Britain | July 19, 1913 |
| 264,963 | Great Britain | Feb. 3, 1927 |